(12) United States Patent
Sato et al.

(10) Patent No.: US 12,147,177 B2
(45) Date of Patent: Nov. 19, 2024

(54) IMAGE FORMING APPARATUS

(71) Applicant: Canon Kabushiki Kaisha, Tokyo (JP)

(72) Inventors: Noriaki Sato, Shizuoka (JP); Rikuo Kawakami, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/326,101

(22) Filed: May 31, 2023

(65) Prior Publication Data

US 2023/0393504 A1 Dec. 7, 2023

(30) Foreign Application Priority Data

Jun. 6, 2022 (JP) .................................. 2022-091353

(51) Int. Cl.
*G03G 15/20* (2006.01)
*G03G 15/00* (2006.01)

(52) U.S. Cl.
CPC ....... *G03G 15/205* (2013.01); *G03G 15/5004* (2013.01); *G03G 15/5045* (2013.01); *G03G 15/80* (2013.01); *G03G 2215/00978* (2013.01)

(58) Field of Classification Search
USPC ......................................................... 399/69
See application file for complete search history.

(56) References Cited

U.S. PATENT DOCUMENTS

| | | | |
|---|---|---|---|
| 9,915,918 B2 | 3/2018 | Nanai et al. | |
| 11,644,774 B2 | 5/2023 | Shimura et al. | |
| 2019/0286029 A1* | 9/2019 | Adachi | G03G 15/2053 |
| 2020/0033775 A1* | 1/2020 | Inoue | G05D 23/24 |

FOREIGN PATENT DOCUMENTS

| | | |
|---|---|---|
| JP | H04-44075 A | 2/1992 |
| JP | H10-177319 A | 6/1998 |
| JP | H10-177391 A | 6/1998 |
| JP | 2007-188032 A | 7/2007 |
| JP | 2017-053915 A | 3/2017 |
| JP | 2017-054071 A | 3/2017 |
| JP | 2021-056274 A | 4/2021 |

* cited by examiner

*Primary Examiner* — Quana Grainger
(74) *Attorney, Agent, or Firm* — Venable LLP

(57) ABSTRACT

An image forming apparatus includes an attachment portion to which any one of a first fixing apparatus and a second fixing apparatus is selectively attached, and a power supply circuit including a plurality of power supply paths. The first fixing apparatus includes a plurality of first heating elements grouped into a plurality of groups, and a number of the plurality of groups is equal to a number of the plurality of power supply paths. The second fixing apparatus includes at least one second heating element grouped into at least one group whose number is smaller than the number of the power supply paths. In a state where the second fixing apparatus is attached to the image forming apparatus, a power supply path of the plurality of power supply paths in which a power line has a largest allowable current value is electrically connected with the at least one second heating element.

25 Claims, 13 Drawing Sheets

IMAGE FORMING APPARATUS

BACKGROUND OF THE INVENTION

Field of the Invention

The present invention relates to an image forming apparatus that forms images on recording materials.

Description of the Related Art

An electrophotographic image forming apparatus includes a fixing apparatus that fixes an image formed on a recording material by using toner, to the recording material by performing a heating process on the image. Japanese Patent Application Publication No. H04-44075 describes a so-called film-heating fixing apparatus that includes a tubular film and a heater disposed inside the film and having a heating element, and that heats an image formed on a recording material, via the film.

Another known fixing apparatus includes a plurality of heating elements for improving the performance of the fixing apparatus. Japanese Patent Application Publication No. H10-177319 describes a configuration for suppressing the temperature rise of an area that recording materials do not pass through (i.e., the temperature rise of a non-sheet passing portion). In this configuration, two heating elements are disposed, and the distribution of heat generated by one heating element is made different in the longitudinal direction, from the distribution of heat generated by the other heating element. Specifically, the distribution of heat of the whole heater is controlled by changing the energization rate of the two heating elements, so that the temperature rise of the area that the recording materials do not pass through is suppressed. Japanese Patent Application Publication No. 2017-54071 describes a configuration for suppressing the temperature rise of a non-sheet passing portion and improving the energy-saving performance. In this configuration, a plurality of heating elements are disposed adjacent to each other in the longitudinal direction, and the heating elements are selectively energized in accordance with the width of a recording material.

The apparatus body of an image forming apparatus includes a circuit for supplying electric power to a fixing apparatus and controlling the fixing apparatus. The circuit of the apparatus body is electrically connected with a circuit of the fixing apparatus. For example, the circuit of the apparatus body includes power lines for supplying electric power to heating elements of the fixing apparatus; control elements for controlling the electric power supplied to the heating elements; signal lines for transmitting signals sent from sensors disposed in the fixing apparatus; and a safety circuit for shutting off the electric power supplied to the heating elements, depending on the signals sent from the sensors.

However, if the image forming apparatus is configured so that any one of a plurality of types of fixing apparatus can be selectively attached to the image forming apparatus, and the apparatus body includes different power supply circuits and safety circuits for the plurality of types of fixing apparatus, the number of components, such as the power lines and the control elements, will increase, which will lead to the upsizing of the apparatus body. In addition, in a configuration in which the electric power is supplied to the heating elements of the fixing apparatus through a plurality of paths, if a component, such as a power line or a control element, is used without consideration of the magnitude of current that flows, in a fixing process, in a heating element disposed on a corresponding path, the component may have unnecessarily large allowable capacity, which may lead to the upsizing of the apparatus body.

SUMMARY OF THE INVENTION

The present invention provides an image forming apparatus that can be downsized.

According to an aspect of the invention, an image forming apparatus includes an attachment portion to which any one of a first fixing apparatus and a second fixing apparatus is selectively attached, and a power supply circuit including a plurality of power supply paths by which electric power is supplied to the first fixing apparatus or the second fixing apparatus attached to the attachment portion, the plurality of power supply paths being configured to control the electric power independently from each other, wherein each of the plurality of power supply paths includes a power line configured to transmit electric power, wherein the first fixing apparatus includes a plurality of first heating elements configured to generate heat when energized, the plurality of first heating elements is grouped into a plurality of groups configured to receive power supply independently from each other, and a number of the plurality of groups is equal to a number of the plurality of power supply paths, wherein the second fixing apparatus includes at least one second heating element configured to generate heat when energized, and the at least one second heating element is grouped into at least one group whose number is smaller than the number of the power supply paths, and wherein in a state where the second fixing apparatus is attached to the image forming apparatus, a power supply path of the plurality of power supply paths in which the power line has a largest allowable current value is electrically connected with the second heating element.

According to another aspect of the invention, an image forming apparatus includes an attachment portion to which any one of a first fixing apparatus and a second fixing apparatus is selectively attached, and a power supply circuit including a plurality of power supply paths by which electric power is supplied to the first fixing apparatus or the second fixing apparatus attached to the attachment portion, the plurality of power supply paths being configured to control the electric power independently from each other, wherein each of the power supply paths includes a control element configured to control electric power, wherein the first fixing apparatus includes a plurality of first heating elements configured to generate heat when energized, the plurality of first heating elements is grouped into a plurality of groups configured to receive power supply independently from each other, and a number of the plurality of groups is equal to a number of the plurality of power supply paths, wherein the second fixing apparatus includes at least one second heating element configured to generate heat when energized, and the at least one second heating element is grouped into at least one group whose number is smaller than the number of the power supply paths, and wherein in a state where the second fixing apparatus is attached to the image forming apparatus, a power supply path of the plurality of power supply paths in which the control element has a largest allowable current value is electrically connected with the second heating element.

According to another aspect of the invention, an image forming apparatus includes an attachment portion to which any one of a first fixing apparatus and a second fixing apparatus is selectively attached, and a power supply circuit including a plurality of power supply paths by which electric power is supplied to the first fixing apparatus or the second fixing apparatus attached to the attachment portion, the plurality of power supply paths being configured to control the electric power independently from each other, wherein the first fixing apparatus includes a plurality of first heating elements configured to generate heat when energized, the plurality of first heating elements is grouped into a plurality of groups configured to receive power supply independently from each other, and a number of the plurality of groups is equal to a number of the plurality of power supply paths, wherein the second fixing apparatus includes at least one second heating element configured to generate heat when energized, and the at least one second heating element is grouped into at least one group whose number is smaller than the number of the power supply paths, and wherein in a state where the second fixing apparatus is attached to the image forming apparatus, one part of the plurality of power supply paths is electrically connected with the second heating element, and another part of the plurality of power supply paths is not electrically connected with the second heating element.

According to another aspect of the invention, an image forming apparatus includes an attachment portion to which any one of a first fixing apparatus and a second fixing apparatus is selectively attached, wherein the first fixing apparatus includes (a) a plurality of first heating elements configured to generate heat when energized, and grouped into a plurality of groups configured to receive power supply independently from each other, (b) a first temperature-detection portion configured to issue a detection signal in accordance with a temperature of the first heating elements, and (c) a first abnormality-detection portion configured to issue an abnormality notification signal depending on the detection signal from the first temperature-detection portion, and wherein the second fixing apparatus includes (a) at least one second heating element configured to generate heat when energized, and grouped into at least one group whose number is smaller than a number of the plurality of groups, (b) a second temperature-detection portion configured to issue a detection signal in accordance with a temperature of the second heating element, and (c) a second abnormality-detection portion configured to issue an abnormality notification signal depending on the detection signal from the second temperature-detection portion, a signal line configured to transmit an abnormality notification signal sent from the first abnormality-detection portion in a state where the first fixing apparatus is attached to the image forming apparatus, and transmit an abnormality notification signal sent from the second abnormality-detection portion in a state where the second fixing apparatus is attached to the image forming apparatus, and a power shutoff portion configured to shut off electric power supplied to the first fixing apparatus or the second fixing apparatus, the power shutoff portion being configured to shut off the electric power if an abnormality notification signal is transmitted to the power shutoff portion through the signal line.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

First Embodiment

First, an image forming apparatus of one embodiment (a first embodiment) will be described. The image forming apparatus of the present disclosure may be an apparatus that forms an image (toner image) on a recording material by using the electrophotographic process, and that causes a fixing apparatus to fix the image to the recording material. Examples of the image forming apparatus include a single-function printer, a copying machine, and a multi-function printer.

Outline of Image Forming Apparatus

Figure 1:
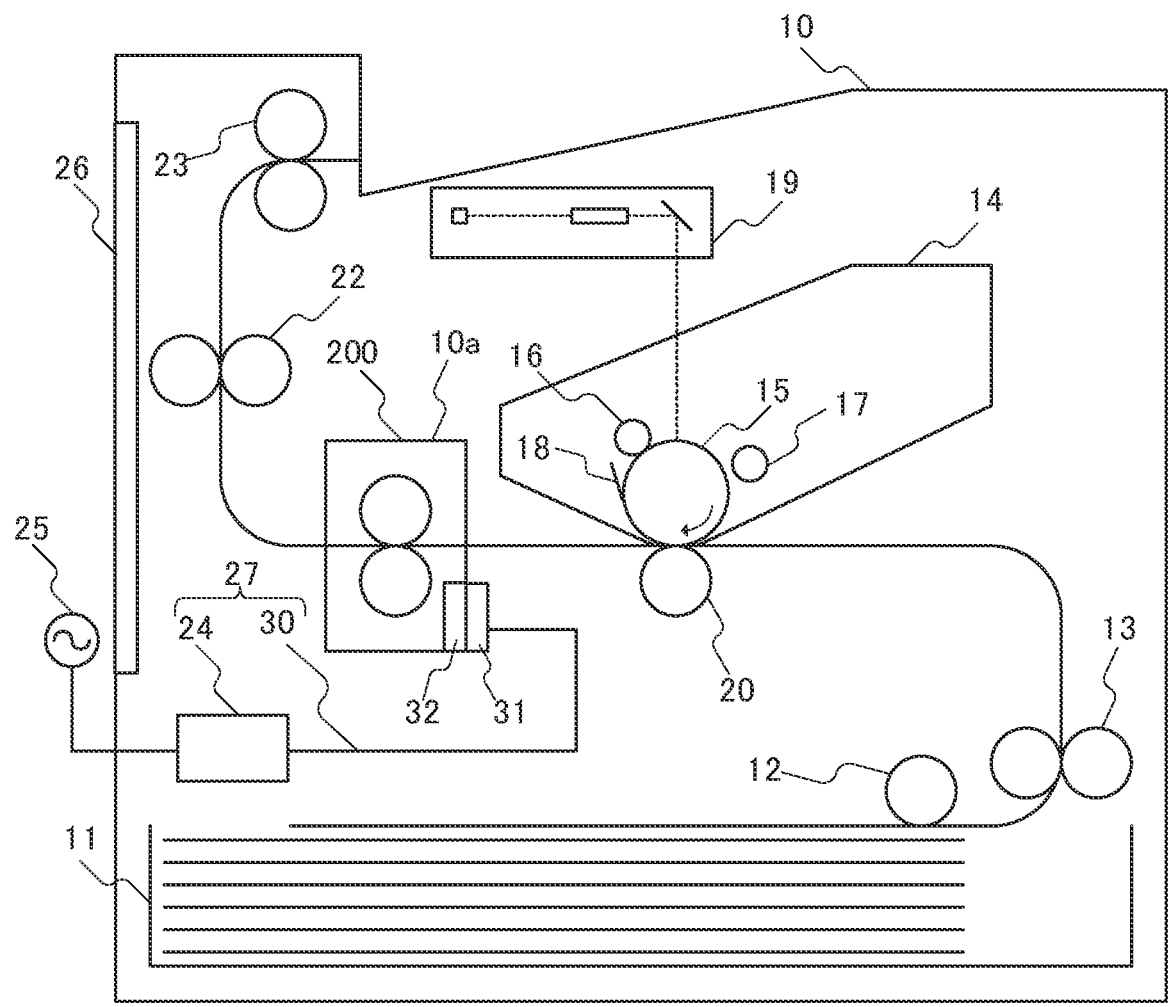
FIG. 1 is a schematic diagram of an image forming apparatus of a first embodiment.

FIG. 1 is a schematic diagram illustrating a cross section of an image forming apparatus 10 of the present embodiment. The image forming apparatus 10 is an electrophotographic laser beam printer. The image forming apparatus 10 forms an image on a recording material in accordance with image information sent from an external device. The recording material may be a paper sheet, such as a plain paper sheet or a thick paper sheet, a plastic film, a cloth sheet, a sheet material, such as a coated paper sheet, on which certain surface treatment has been performed, a specially-shaped sheet material, such as an envelope or an index paper sheet, or any one of a variety of sheets having different sizes and materials.

The image forming apparatus 10 includes a process cartridge 14, a fixing apparatus 200, and a conveyance mechanism. The process cartridge 14 serves as an image forming portion (processing portion) that forms an image (toner image) on a recording material. The fixing apparatus 200 fixes the image to the recording material, and the conveyance mechanism conveys the recording material. The process cartridge 14 includes a photosensitive drum 15, a charger 16, a development unit 17, and a cleaning portion 18. The photosensitive drum 15 serves as an image bearing member, and the charger 16, the development unit 17 and the cleaning portion serve as process portions that act on the image bearing member. The development unit 17 includes a developer bearing member (developing roller) that rotates while bearing toner, which serves as developer. A scanner unit 19 serves as an exposure portion, and it is disposed above the process cartridge 14. In addition, a transfer roller 20 that serves as a transfer member is disposed at a position at which the transfer roller 20 faces the photosensitive drum 15. The toner image is transferred onto the recording material in a transfer portion that is a nip portion between the photosensitive drum 15 and the transfer roller 20. An example of the configuration of the fixing apparatus 200 will be described below.

When an image forming operation is executed, the photosensitive drum 15 is rotated, and the surface of the photosensitive drum 15 is uniformly charged by the charger 16. The scanner unit 19 exposes the photosensitive drum 15 by emitting a laser beam to the photosensitive drum 15 in accordance with image information that the image forming apparatus 10 has received from an external device, and thereby forms an electrostatic latent image on the surface of the photosensitive drum 15. The development unit 17 supplies the toner from the developing roller to the photosensitive drum 15, and it develops the electrostatic latent image into a toner image.

In parallel with the above-described process, a recording material stacked on a feeding tray 11 is fed, one by one, by a feeding roller 12. A conveyance roller 13 conveys the recording material toward the transfer portion so that the recording material reaches the transfer portion at a timing at which the toner image, formed on the photosensitive drum 15, reaches the transfer portion. In the transfer portion, the toner image is transferred from the photosensitive drum 15 to the recording material by an electric field produced by applying a transfer voltage to the transfer roller 20. Note that the sticking substance, such as remaining toner that has not been transferred to the recording material in the transfer portion and that is left on the photosensitive drum 15, is removed by the cleaning portion 18.

The fixing apparatus 200 has a heat-fixing system that includes a heating element, which generates heat when energized. The toner image on the recording material is heated and pressed while the recording material is nipped and conveyed in the nip portion (fixing nip) of the fixing apparatus 200. In this fixing process, an image fixed to the recording material can be obtained. The recording material that has passed through the fixing apparatus 200 is discharged to the outside of the image forming apparatus 10 by discharging roller pairs 22 and 23. With this operation, a series of image forming operations is completed.

Next, a configuration of a power supply of the image forming apparatus 10 will be described. The image forming apparatus 10 is supplied with electric power from a commercial alternating-current power supply 25. The image forming apparatus 10 contains a power supply circuit 27 that is connected with the external alternating-current power supply 25, and that supplies the electric power to an electrical component contained in the image forming apparatus 10. The power supply circuit 27 includes a power supply unit 24 and a wire portion 30. The power supply unit 24 controls the voltage, current, waveform, and the like of the electric power that the power supply circuit 27 supplies in accordance with the electrical component to be driven. The wire portion 30 transmits the electric power from the power supply unit 24 to the electrical component. An example of the electrical component is the fixing apparatus 200. The power supply circuit 27 will be described in detail below.

In the present embodiment, the fixing apparatus 200 can be detachably attached to an attachment portion 10a disposed in the apparatus body (except the fixing apparatus 200 and the process cartridge 14) of the image forming apparatus 10. A user can perform replacement work of the fixing apparatus 200 by opening a door 26 disposed on a side-face portion of the image forming apparatus 10, and by exposing the fixing apparatus 200 to the outside.

The apparatus body of the image forming apparatus 10 and the fixing apparatus 200 are respectively provided with connectors 31 and 32. The connector 31 of the apparatus body includes contact terminals connected with the wire portion 30. The connector 32 of the fixing apparatus 200 includes contact terminals connected with a circuit formed in the fixing apparatus 200. The contact terminals of the connector 31 and the contact terminals of the connector 32 are brought into contact with each other when the fixing apparatus 200 is attached to the image forming apparatus 10, so that the fixing apparatus 200 is electrically connected with the power supply circuit 27 of the image forming apparatus 10. The connectors 31 and 32 may be drawer connectors that are less affected by, for example, assembly tolerance of the fixing apparatus 200.

The image forming apparatus 10 of the present embodiment is configured so that any one of a plurality of types of the fixing apparatus 200 can be selectively attached to the image forming apparatus 10. Thus, a fixing apparatus corresponding to a model (e.g., a high image quality model or a low-priced model) of the image forming apparatus 10 can be attached to the image forming apparatus body that is fixed in configuration. Consequently, it becomes possible to satisfy a variety of user needs while reducing the cost of the image forming apparatus 10.

Hereinafter, the description will be made for two types of fixing apparatuses, 200A and 200B, each of which can be used as the fixing apparatus 200. A first type of fixing apparatus (i.e., a first fixing apparatus) 200A includes three groups of heating elements; and a second type of fixing apparatus (i.e., a second fixing apparatus) 200B includes two groups of heating elements, which are smaller in number than the groups of the first type of fixing apparatus. The group of heating elements is a subset of heating elements, and the electric power supplied to the subset can be controlled independently. The first fixing apparatus 200A has higher performance than that of the second fixing apparatus 200B in terms of the distribution of heat, because the distribution of heat generated by the first fixing apparatus 200A can be controlled more finely than the distribution of heat generated by the second fixing apparatus 200B. The second fixing apparatus 200B is advantageous in the balance between cost and performance.

Fixing Apparatus 200A

Figure 2:
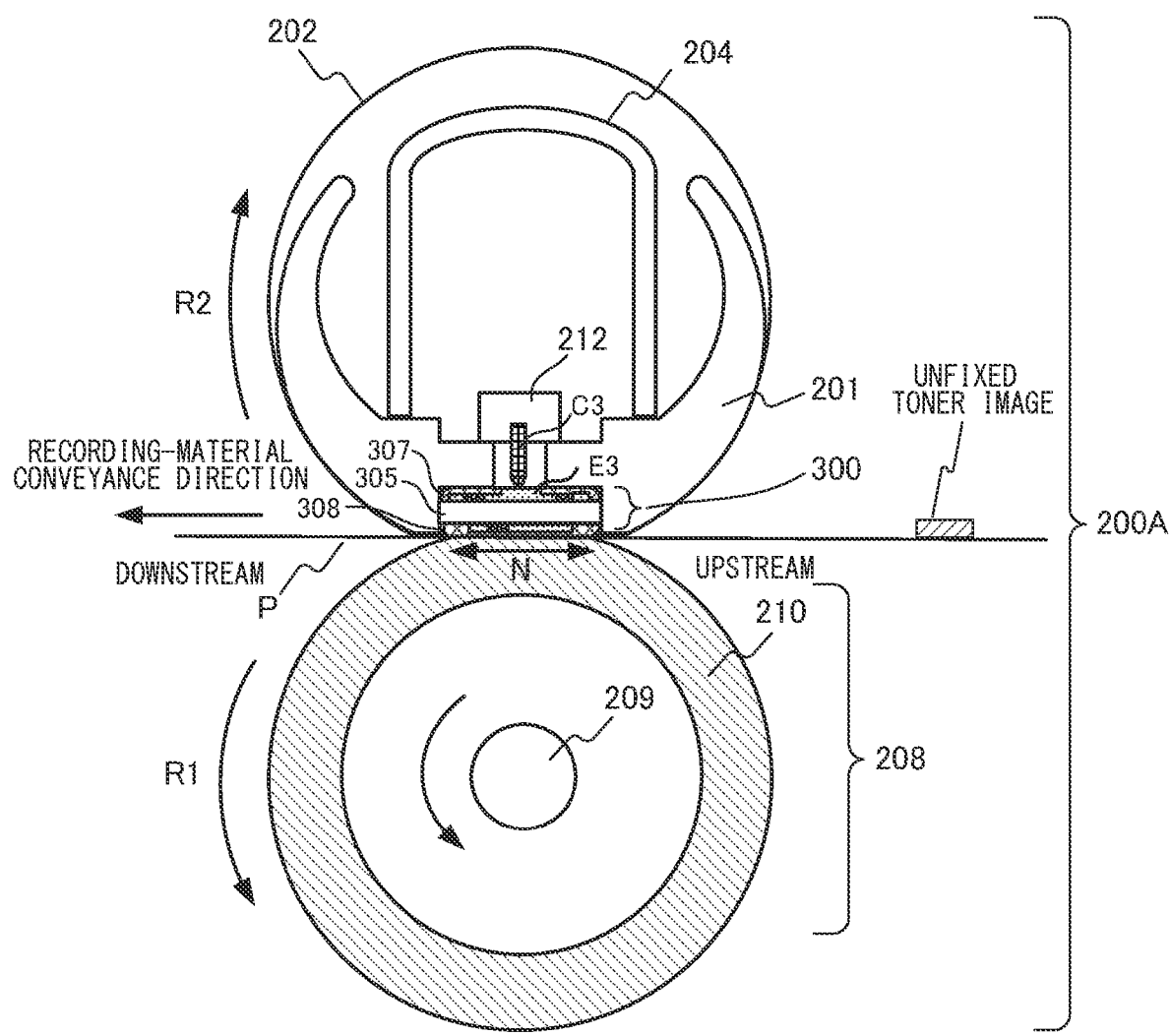
FIG. 2 is a schematic diagram illustrating a fixing apparatus 200A of the first embodiment.

FIG. 2 is a schematic diagram illustrating a cross section of the first type of fixing apparatus 200A of the present embodiment. The fixing apparatus 200A includes a tubular fixing film 202, a heater 300, a pressing roller 208, and a metal stay 204. The heater 300 is disposed in an internal space of the fixing film 202. The pressing roller 208 and the heater 300 form a fixing nip portion N via the fixing film 202. Hereinafter, the longitudinal direction of the fixing nip portion N (i.e., a rotation-axis direction of the pressing roller 208) is defined as the longitudinal direction of the fixing apparatus 200A.

The fixing film 202 may be a multilayered heat-resistant film formed like a tube. For example, the base layer of the fixing film 202 is formed thin; and made of heat-resistant resin such as polyimide, or made of metal such as stainless steel. The surface of the fixing film 202 is coated with heat-resistant resin, which serves as a release layer. The heat-resistant resin has excellent releasability for preventing the toner from sticking to the fixing film 202, and for increasing the separation property between the recording material P and the fixing film 202. For example, the heat-resistant resin may be tetrafluoroethylene-perfluoroalkylvinyl ether copolymer (PFA). In addition, an elastic layer made of heat-resistant rubber, such as silicone rubber, may be formed between the above-described base layer and release layer for increasing the image quality.

The pressing roller 208 includes a core metal 209 made of a material, such as iron or aluminum; and an elastic layer 210 made of a material, such as silicone rubber.

The heater 300 is a member in which heating elements, electrodes, and protective layers 307 and 308, which will be described below, are formed on a board 305 made of a heat-resistant material, such as ceramic. The heater 300 generates heat when the heating elements are energized. A protective layer of the heater 300 includes the protective layers 307 and 308. The protective layer 308 is disposed on the fixing nip portion N side in the thickness direction of the board 305, and the protective layer 307 is disposed on a side opposite to the fixing nip portion N in the thickness direction of the board 305.

On the side opposite to the fixing nip portion N in the thickness direction of the board 305, a plurality of electrodes is exposed (FIG. 2 illustrates a below-described electrode E3, as an example). The electrodes are in contact with respective contact members (FIG. 2 illustrates a contact member C3, as an example). The electric power supplied from the power supply circuit 27 of the image forming apparatus 10 is supplied to the heater 300 via a contact portion between the contact member C3 and the electrode E3.

In addition, the fixing apparatus 200A includes a safety element 212, such as a heat-sensitive switch or a thermal fuse. The safety element operates when the heater 300 generates the heat abnormally, and it shuts off the electric power supplied to the heater 300. The safety element 212 is disposed so as to be in contact with the heater 300 or a holding member 201 that is in contact with the heater 300, so that the safety element 212 receives the heat directly or indirectly from the heater 300.

The heater 300 is held by the holding member 201 made of heat-resistant resin. The holding member 201 also has a guide function for guiding the rotation of the fixing film 202. The holding member 201 and the heater 300 constitute a nip forming unit, and the fixing nip portion N is formed between the nip forming unit and the pressing roller 208.

The metal stay 204 receives pressing force (not illustrated), and it urges the holding member 201 that holds the heater 300, toward the pressing roller 208. With this operation, the fixing nip portion N is formed between the fixing film 202 and the pressing roller 208, and pressing force is produced in the fixing nip portion N.

The pressing roller 208 receives power from a motor included in the image forming apparatus 10 or the fixing apparatus 200A, and it rotates in a direction indicated by an arrow R1. The fixing film 202 is rotated in a direction indicated by an arrow R2, by the rotation of the pressing roller 208.

The fixing apparatus 200A performs a fixing process on a toner image formed on a recording material P and still not fixed to the recording material P, while nipping and conveying the recording material P in the fixing nip portion N. Specifically, the toner image is fixed to the recording material P by the fixing film 202, which is heated by the heat from the heater 300, heating the toner image formed on the recording material P.

Note that for ensuring the sliding property of the fixing film 202 and obtaining the stable state of rotation of the fixing film 202 rotated by the rotation of the pressing roller 208, it is preferable that fluorine-based lubricating grease (not illustrated) having high heat resistance property be interposed between the heater 300 and the fixing film 202. In another case, a thin plate (or a flexible sheet material), such as an aluminum sheet, that has high thermal conductivity may be interposed between the fixing film 202 and the heater 300. In this case, the holding member 201, the heater 300, and the thin plate constitute a nip forming unit, and the fixing nip portion N is formed between the nip forming unit and the pressing roller 208.

Heater 300

Figure 3A:
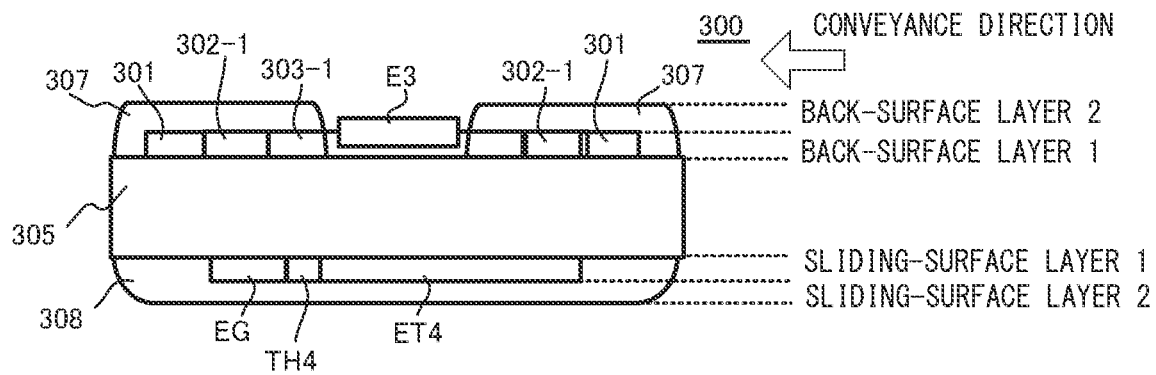
FIG. 3A is a cross-sectional view of a heater 300 of the first embodiment.
Figure 3B:
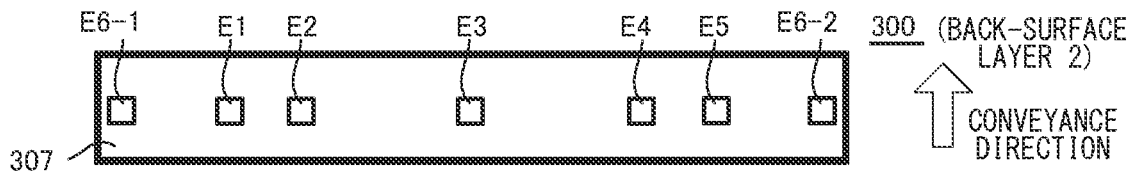
FIG. 3B is a plan view of each layer of the heater 300 of the first embodiment.
Figure 3B:
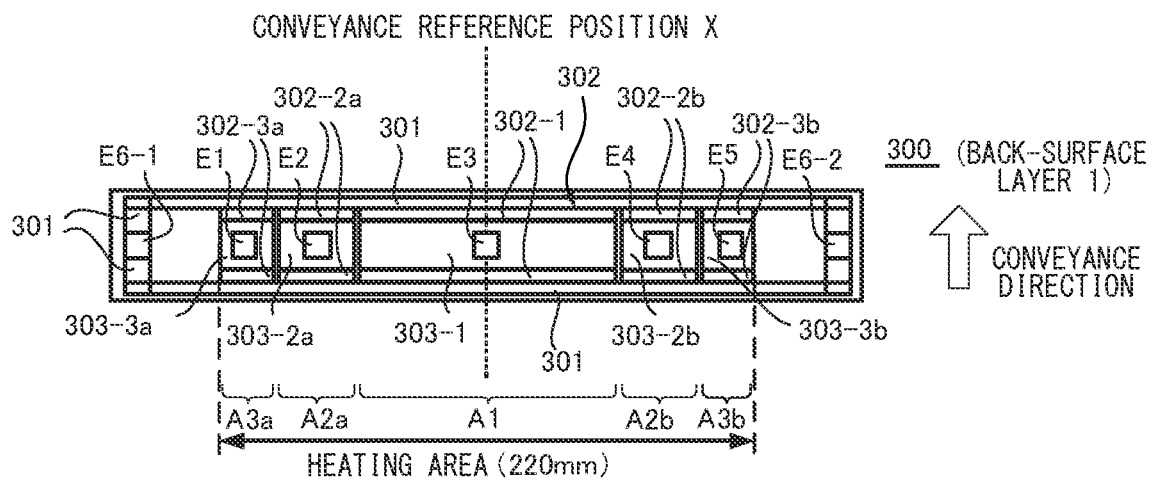
Figure 3B:
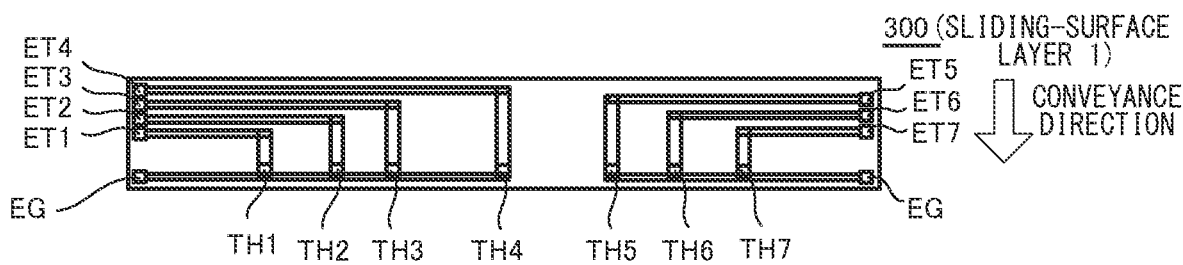
Figure 3B:
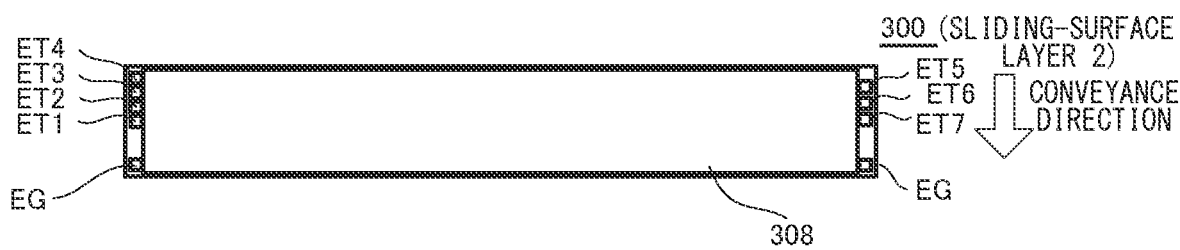

Next, with reference to FIGS. 3A and 3B, a configuration of the heater 300 of the first type of fixing apparatus 200A will be described. FIG. 3A is a cross-sectional view of the heater 300, and FIG. 3B is a plan view of each layer of the heater 300. FIG. 3B illustrates a conveyance reference position X for the recording material P, which is positioned in the image forming apparatus 10 of the present embodiment. The reference of conveyance in the present embodiment is a center reference, and the recording material P is conveyed such that the center line of the recording material P in a direction (i.e., a longitudinal direction) orthogonal to the conveyance direction of the recording material P is aligned with the conveyance reference position X. FIG. 3A is a cross-sectional view of the heater 300, taken at the conveyance reference position X.

As illustrated in FIGS. 3A and 3B, the heater 300 includes a back-surface layer 1 that is formed on the board 305, a back-surface layer 2 that covers the back-surface layer 1, a sliding-surface layer 1 that is formed on a surface of the board 305 opposite to the back-surface layer 1, and the sliding-surface layer 2 that covers the sliding-surface layer 1.

On the back-surface layer 1, a plurality of heating elements 302 is disposed adjacent to each other in the longitudinal direction. That is, the fixing apparatus 200A in which the heater 300 is disposed is the same type of fixing apparatus as that described in Japanese Patent Application Publication No. 2017-54071. In the present embodiment, the heating elements 302 are grouped into the following three groups that are independently driven. A heating element 302-1 belongs to a group 1, and it is disposed in a center portion in the longitudinal direction. The longitudinal width of the heating element 302-1 of the group 1 is 145 mm, which is nearly equal to the width of the A5-size sheet. Heating elements 302-2 belong to a group 2, and they are disposed on both outer sides of the heating element 302-1. The heating elements 302-2 includes a pair of heating elements 302-2a and 302-2b. The width of the heating elements 302-2 of the group 2 between both outer edges of the heating elements 302-2 is 185 mm, which is nearly equal to the width of the B5-size sheet. Thus, the first type of fixing apparatus (first fixing apparatus) 200A includes the heating elements 302 that serves as a plurality of first heating elements, and that are divided into groups whose number is equal to the number (three in the present embodiment) of power supply paths (power supply groups) of the power supply circuit of the image forming apparatus body.

Heating elements 302-3 belong to a group 3, and they are disposed on both outer sides (both outermost sides) of the heating elements 302-2 of the group 2. The heating elements 302-3 include a pair of heating elements 302-3a and 302-3b. The width of the heating elements 302-3 of the group 3 between both outer edges of the heating elements 302-3 is 220 mm, which is nearly equal to the width of the letter-size sheet. That is, the whole length of the heating elements 302 is 220 mm.

Thus, in the present embodiment, the heating elements 302 are physically divided into five heating elements, and the five heating elements are grouped into the three groups of heating elements, 302-1, 302-2, and 302-3, that are independently driven. Note that since the number of the heating elements are one example, the number of the heating elements and the number of the groups may be changed.

As illustrated in FIG. 3B, the heater 300 includes electrodes E1 to E5, and common electrodes E6-1 and E6-2. In addition, the heater 300 includes conductor patterns, 303-1, 303-2, and 303-3, that electrically connect the electrodes, E1 to E5, and the heating elements 302; and a conductor pattern 301 that electrically connects the common electrodes, E6-1 and E6-2, and the heating elements 302.

As illustrated in FIG. 3B, energizing paths from the electrodes, E1 to E5, to the common electrodes, E6-1 and E6-2, through the heating elements 302 are formed via the conductor patterns 301, 303-1, 303-2, and 303-3. With this configuration, the three groups of the heating elements 302-1, 302-2, and 303-3 can be driven independently. For example, if current flows in a path from the electrode E3 to the common electrodes, E6-1 and E6-2, through the conductor pattern 303-1, the heating element 302-1 of the group 1, and the conductor pattern 301, the heating element 302-1 of the group 1 generates the Joule heat. In addition, if current flows in a path from the electrode, E2 and E4, to the common electrodes, E6-1 and E6-2, through the conductor patterns 303-2, the heating elements 302-2 of the group 2, and the conductor pattern 301, the heating elements 302-2 of the group 2 generate the Joule heat. In addition, if current flows in a path from the electrode, E1 and E5, to the common electrodes, E6-1 and E6-2, through the conductor patterns 303-3, the heating elements 302-3 of the group 3, and the conductor pattern 301, the heating elements 302-3 of the group 3 generate the Joule heat.

Thus, the amount of heat generated by each of the three groups of the heating elements 302-1, 302-2, and 302-3 can be independently controlled by independently controlling the amount of current supplied to a corresponding one of the three groups of electrodes (i.e., the electrode E1, the electrodes E2 and E4, and the electrodes E3 and E5).

The heating elements 302-1, 302-2, and 302-3 of the corresponding groups disposed in the longitudinal direction have respective longitudinal areas in which they generate heat. Hereinafter, the longitudinal areas of the heating elements 302-1, 302-2, and 302-3 are referred to as heating areas A1 to A3.

The back-surface layer 2 is the protective layer 307 that has insulating property. In the present embodiment, the protective layer 307 is made of glass. The protective layer 307 covers the conductor patterns 301, 303-1, 303-2, and 303-3, and the heating elements 302. In addition, the protective layer 307 is formed so as not to cover the electrodes E1 to E5, E6-1, and E6-2. Thus, the contact members (including the contact member C3 illustrated in FIG. 2) can be connected to the electrodes E1 to E5, E6-1, and E6-2, from the back-surface layer 2 side of the heater 300.

On the sliding-surface layer 1 opposite to the back-surface layer 1 with respect to the board 305, thermistors TH (TH1 to TH7) are disposed. The thermistors TH (TH1 to TH7) serve as temperature detection portions, and they detect the temperature of the longitudinal areas in which the heating elements 302-1, 302-2, and 302-3 are disposed. In addition, conductors ET1 to ET7 and a conductor EG are also disposed on the sliding-surface layer 1. Each of the conductors ET1 to ET7 functions as an independent wiring pattern used for obtaining a temperature signal detected by a corresponding thermistor TH. The conductor EG functions as a wiring pattern used for supplying electric power to the thermistors.

Since the temperature detection portions are disposed in the respective heating areas in which the heating elements generate heat, the heating areas A1 to A3 of the heater, disposed in the longitudinal direction, can be controlled independently such that the heating areas A1 to A3 have temperatures different from each other.

The sliding-surface layer 2 is the protective layer 308 that has sliding property and insulating property. In the present embodiment, the protective layer 308 is made of glass. The protective layer 308 covers the thermistors Tx, the conductors ET, and the conductor EG; and improves the sliding property between the heater 300 and the inner surface of the fixing film 202. In addition, the protective layer 308 is formed so as not to cover both end portions of the heater 300 in the longitudinal direction of the heater 300, for allowing contact members to contact the conductors ET and the conductor EG.

The resistance values of the heating elements 302 are set so that when the image forming apparatus is connected to a commercial alternating-current power supply of 120 V, the heating elements 302 output 1440 W, as a whole. That is, in a case where the heating elements 302 are connected in parallel with each other, the combined resistance of the heating elements is 10Ω. In addition, the amount of heat generated by a heating element is controlled so that the amount of heat (generated by the heating element) per unit length in the longitudinal direction is constant. Thus, the resistance value of the heating element of each group is set such that the resistance value is nearly inversely proportional to the width of a corresponding heating area. Specifically, the resistance value of the heating element 302-1 of the group 1, which has the largest width of the heating area, is set at 15.1Ω. The resistance value (i.e., a combined resistance value of heating elements 302-2a and 302-2b) of the heating elements 302-2 of the group 2, which has the second largest width of the heating area, is set at 55.2Ω. The resistance value (i.e., a combined resistance value of heating elements 302-3a and 302-3b) of the heating elements 302-3 of the group 3, which has the smallest width of the heating area, is set at 63.1Ω.

Since the resistance values of the heating elements of the respective groups are different from each other, currents that flow in the heating elements of the respective groups have values different from each other. In the present embodiment, the maximum alternating-current voltage applied to the apparatus is set at 140 V. The maximum alternating-current voltage is a maximum value of voltage that is outputted from the alternating-current power supply 25, and that is in a variation range allowed for the image forming apparatus 10. When the maximum alternating-current voltage is supplied to the image forming apparatus 10, the maximum current flows in the heating element of each group. The maximum current is 9.3 A in the group 1, 2.5 A in the group 2, and 2.2 A in the group 3. Note that in general, the maximum current that flows in each group is proportional to the rated current of the group (the rated current is a current that flows in a heating element when the heating element is driven with a rated voltage of 120 V). Thus, the rated current of the group 2 is smaller than the rated current of the group 1, and the rated current of the group 3 is smaller than the rated current of the group 2. Thus, the configuration in which a power line and a control element of a power supply path of the apparatus body are determined, as described below, so as to have an allowable current value in accordance with a maximum current value of a heating element of a corresponding group may be referred to as the configuration in which the power line and the control element of the power supply path of the apparatus body are determined in accordance with the rated current of the heating element of the group. Power Supply Circuit in case where Fixing Apparatus 200A is attached to Image Forming Apparatus Next, a circuit configuration of the apparatus body of the image forming apparatus 10 and the fixing apparatus 200A in a case where the fixing apparatus 200A is attached to the image forming apparatus 10 of the present embodiment will be described. The image forming apparatus 10 of the present embodiment includes three groups of circuits (three power supply paths) that can independently control and supply the electric power; and the fixing apparatus 200A includes the three groups of heating elements, as described above. That is, the fixing apparatus 200A includes heating elements of groups whose number is equal to the maximum number of groups that the image forming apparatus 10 can support.

Figure 4:
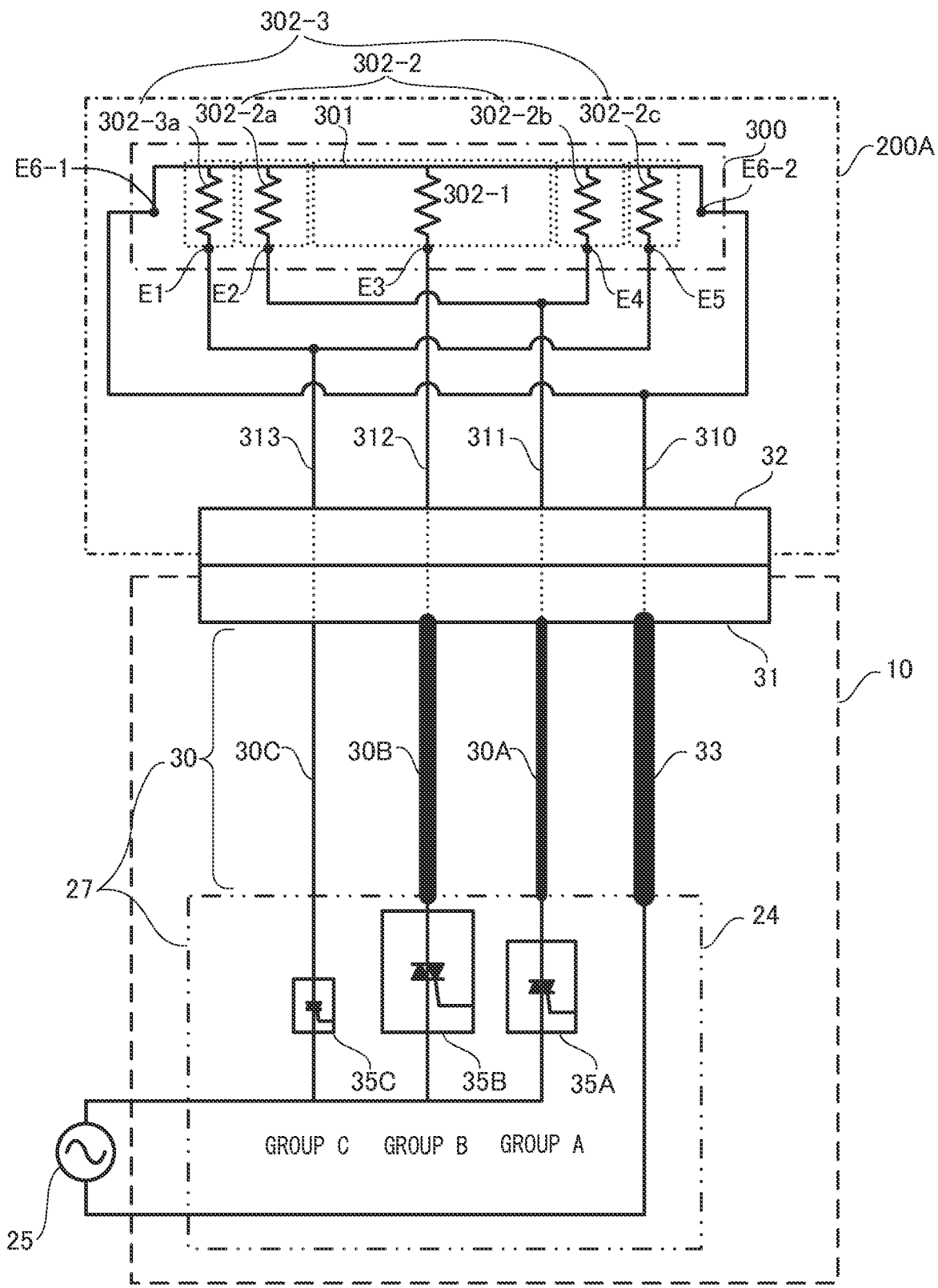
FIG. 4 is a diagram illustrating a circuit configuration in which the fixing apparatus 200A is attached to the image forming apparatus of the first embodiment.

FIG. 4 illustrates a circuit configuration for supplying the electric power to the heating elements 302-1, 302-2, and 302-3 included in the heater 300 of the fixing apparatus 200A. In FIG. 4, a circuit configuration of the apparatus body of the image forming apparatus 10 is indicated by a broken line, and a circuit configuration of the fixing apparatus 200A is indicated by a dot-and-dash line. Power lines 30A to 30C of the apparatus body of the image forming apparatus 10 and power lines 311 to 313 of the fixing apparatus 200A are electrically continuous with each other, via the connection between the connector 31 of the apparatus body and the connector 32 of the fixing apparatus 200A.

In addition, in FIG. 4, a circuit configuration of the power supply unit 24, included in the image forming apparatus 10 and serving as a power supply circuit, is indicated by a dot-dot-dash line; and a circuit configuration of the heater 300, included in the fixing apparatus 200A, is indicated by a dot-dash-dash line. Note that the circuit configuration of the heater 300 is illustrated in a circuit form of the heater 300, which is illustrated in FIGS. 3A and 3B. Each heating element of the heating elements 302 is illustrated as a resistor.

The power supply circuit 27 of the image forming apparatus 10 includes three power supply groups (power supply paths). Each of the three power supply groups can independently control the electric power supplied to a corresponding heating element. Hereinafter, the power supply paths of the power supply circuit 27 are referred to as a power supply path A, a power supply path B, and a power supply path C. The circuit of the power supply path A includes a triac 35A and a power line 30A. The circuit of the power supply path B includes a triac 35B and a power line 30B. The circuit of the power supply path C includes a triac 35C and a power line 30C.

The power supply unit 24 distributes the electric power supplied from the commercial alternating-current power supply 25, to the power supply paths; and outputs the electric power to the power lines 30A to 30C through the triacs 35A to 35C, which serve as control elements. A control portion disposed in the image forming apparatus 10 can control the energization/shutoff of each of the triacs 35A, 35B, and 35C. The power lines 30A to 30C transmit the electric power, supplied from the power supply unit 24 to the respective power supply paths, to a wire portion (i.e., the power lines 311 to 313) of the fixing apparatus 200A.

Note that although the triacs are used, in the present embodiment, as an example of control elements, the control elements for controlling the electric power supplied to the fixing apparatus may be components other than the triacs. For example, switching elements (such as thyristors) may be used as the control elements.

The fixing apparatus 200A includes the power lines 311, 312, and 313, each of which connects a terminal of the connector 32 and the heating element(s) 302 of a corresponding group. The electric power supplied from the power supply circuit 27 of the image forming apparatus 10 is supplied to the heating elements 302-1, 302-2, and 302-3 of the respective groups through the power lines 311 to 313.

The fixing apparatus 200A includes a common line 310, and the image forming apparatus 10 includes a common line 33. When a contact terminal connected with the common line 310 is brought into contact with a contact terminal connected with the common line 33 in the connectors 31 and 32, a circuit for supplying the electric power from the alternating-current power supply 25 to the heating elements 302 is completed. The common lines 310 and 33 are used for all of the three power supply paths.

Next, the allowable current of the power lines and the control elements (triacs) of the present embodiment will be described. As described above, in the fixing apparatus 200A, a maximum current value of one group obtained when the electric power is supplied to the one group is different from a maximum current value of another group obtained when the electric power is supplied to the other group. Thus, in the fixing apparatus, one group (first group) has the largest maximum current value, and another group (second group) has the smallest maximum current value. In the present embodiment, power lines of the power supply circuit of the apparatus body, to which at least the first and second groups are connected, have different allowable current values (i.e., withstand current capacities). Similarly, control elements of the power supply circuit of the apparatus body, to which at least the first and second groups are connected, have different allowable current values (i.e., withstand current capacities). Note that any one of the power line and the control element may have the above-described configuration.

Specifically, the power line 312 of the fixing apparatus corresponds to the group 1 (first group) in which the heating element 302-1 has a small resistance value and the largest maximum current value. Thus, the power line 312 is connected to the power supply path B of the apparatus body. The power line 30B of the power supply path B is a stranded wire of AWG18 (allowable current: 10 A) that has the largest allowable current value in the power lines (except the common line 33) of the power supply circuit 27 of the apparatus body. In addition, the triac 35B of the power supply path B is a triac that has a larger allowable current value of 12 A in the triacs 35A to 35C.

In contrast, the power line 313 of the fixing apparatus corresponds to the group 3 (second group) in which the heating elements 302-3 have a large resistance value and the current flows least in the heating elements 302-3. Thus, the power line 313 is connected to the power supply path C of the power supply circuit 27 of the apparatus body. The power line 30C of the power supply path C is a stranded wire of AWG22 (allowable current: 5 A) that has a smaller allowable current value. In addition, the triac 35C is a triac that has a smaller allowable current of 6 A.

Note that power lines that have the same AWG value may have different allowable current values in different products. Thus, it is desirable to check a value specified in a catalog and use a power line whose allowable current value is equal to or larger than the maximum value of current that flows in the power line.

In FIG. 4, the power lines 30A, 30B, and 30C that constitute the wire portion 30 are illustrated, with the thickness of the lines varied, such that a power line with a larger allowable current value is illustrated with a thicker line, and that a power line with a smaller allowable current value is illustrated with a thinner line. In addition, the triacs 35A, 35B, and 35C are illustrated, with the size of the triacs varied in accordance with the allowable current value of the triacs, such that a triac with a larger allowable current value is illustrated with a larger size. This is because the thickness of the power line of an actual apparatus is commonly made larger as the power line has a larger allowable current value and the size of the triac is commonly made larger as the triac has a larger allowable current value. Note that the power line and the control element may be components other than the above-described stranded wire and triac. However, the thickness or size of a component generally tends to increase as the allowable current value of the component increases.

The power line 30A and the triac 35A of the power supply path A of the apparatus body are connected to the power line 311 of the group 2 of the fixing apparatus, in which the heating elements 302-2 have an intermediate resistance value and an intermediate level of current flows. Thus, the power line 30A and the triac 35A of the power supply path A may have an allowable current value, determined in accordance with the maximum current value of the group 2. Specifically, the allowable current value may be the same as the allowable current value of the power supply path B or the power supply path C, or may be a value between the allowable current value of the power supply path B and the allowable current value of the power supply path C.

In the present embodiment, the power line 30A is an intermediate stranded wire of AWG20 (allowable current: 7.5 A), and the triac 35A has an intermediate capacity of 8 A. Thus, it is preferable that in a power supply path connected to a heating element with a smaller resistance value, the power line and the triac have a larger allowable current value.

In the common line 33 of the wire portion 30, currents of all groups join with each other. Thus, the magnitude of current that flows in the common line 33 is larger than the magnitude of current that flows in the group 1. For this reason, it is preferable that the capacity of the common line 33 be equal to or larger than the capacity of the line of the group 1, which has a larger allowable current value. In the present embodiment, the common line 33 is a stranded wire of AWG14 (allowable current: 19 A), which has a capacity larger than that of the line of the group 1.

The power line 30A and the triac 35A of the power supply path A of the apparatus body have an allowable current value excessively larger than the maximum current value of the group 2 of the fixing apparatus, which is connected with the apparatus body. Specifically, the allowable current value of the power line 30A and the triac 35A of the power supply path A of the apparatus body is equal to or larger than three times the maximum current value (2.5 A) of the group 2 of the fixing apparatus, or is larger than the maximum current value by a value of 5 A or more. This is for making it possible to use the power line 30A and the triac 35A for a below-described fixing apparatus 200B that includes less groups, when the fixing apparatus 200A is replaced with the fixing apparatus 200B. The detailed description thereof will be made below.

Safety Circuit of Fixing Apparatus 200A

Figure 12:
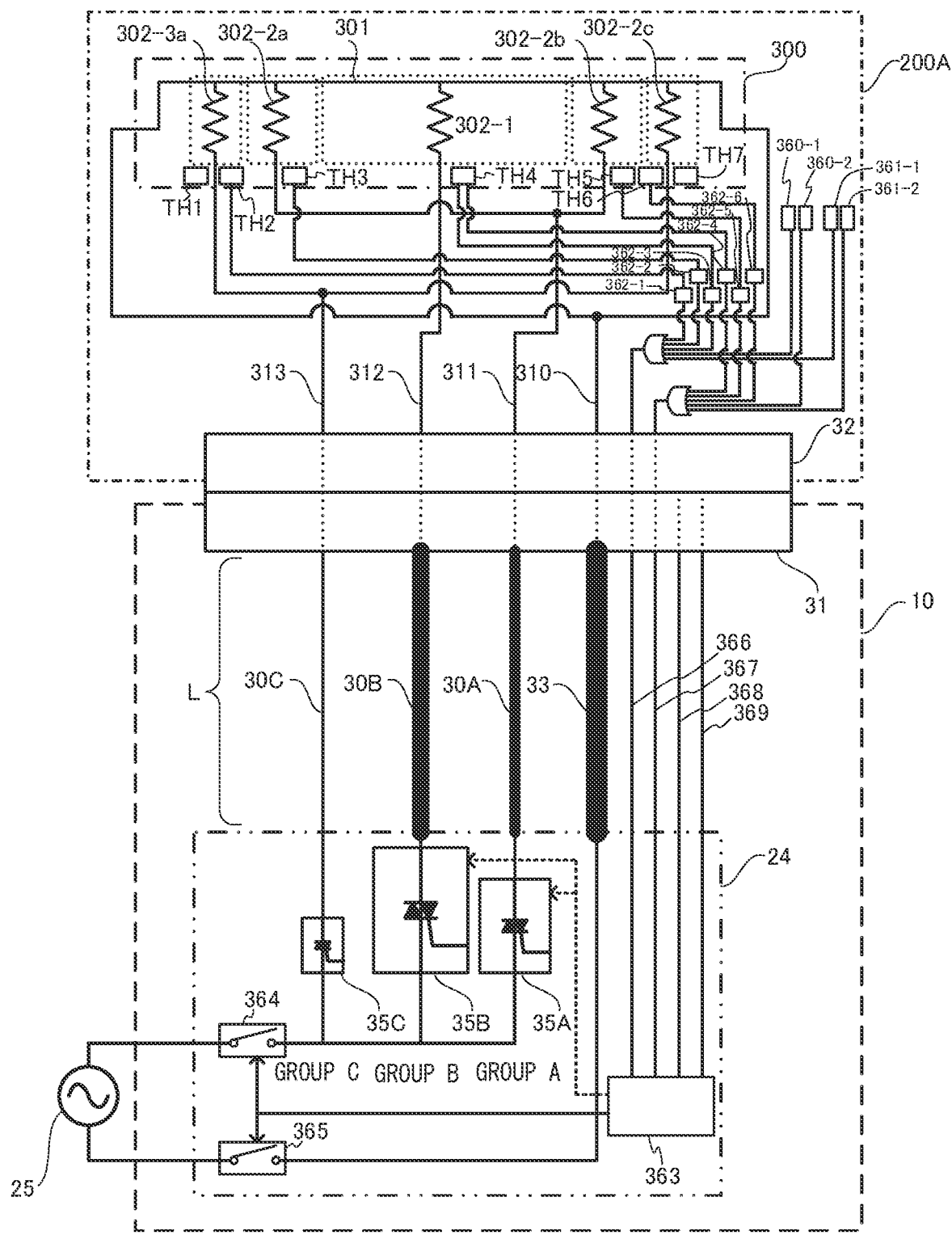
FIG. 12 is a diagram illustrating a safety circuit of the fixing apparatus 200A of the first embodiment.

Next, a configuration of a safety circuit that corresponds to the fixing apparatus 200A of the present embodiment will be described with reference to FIG. 12. The safety circuit includes an abnormality detection circuit and a power shutoff circuit 363. The abnormality detection circuit detects an abnormality of the fixing apparatus 200A. The power shutoff circuit 363 shuts off the electric power supplied to the fixing apparatus 200A, when an abnormality of the fixing apparatus 200A is detected.

In the present embodiment, the abnormality detection circuit is disposed in the fixing apparatus, and the power shutoff circuit 363 is disposed in the apparatus body. The abnormality detection circuit of the fixing apparatus 200A includes three types of circuit: an abnormal-temperature detection circuit, a crack detection circuit 360, and a breakage detection circuit 361. Preferably, the abnormality detection circuit has a configuration that corresponds to the number of the power supply paths of the power supply circuit 27 of the apparatus body.

In the abnormal-temperature detection circuit, the thermistors (TH1 to TH7) monitor the temperature of each group for detecting an abnormal temperature. In the fixing apparatus 200A, the abnormal-temperature detection circuit includes six abnormal-temperature detection circuits 362-1 to 362-6. The thermistors TH1 to TH7 function as a first temperature-detection portion that outputs a signal in accordance with the temperature of each group of the heating elements 302. The abnormal-temperature detection circuit 362-1 to 362-6 function as a first abnormality-detection portion that outputs an abnormality notification signal, depending on the detection signal from the first temperature-detection portion.

The crack detection circuit 360 that serves as a crack detection portion, and the breakage detection circuit 361 that serves as a breakage detection portion are disposed for enhancing the safety of the heating elements that belong to the three groups. The crack detection circuit 360 detects the cracking of the board 305 of the heater, caused by the thermal stress or the like produced when the heater generates heat abnormally. The breakage detection circuit 361 detects the breakage of a heating element, caused by the concentration of current or the like produced when the heater is energized abnormally. For enhancing the safety against the multiple failure, it is preferable that the crack detection circuit 360 include two groups (i.e., crack detection circuits 360-1 and 360-2), and that the breakage detection circuit 361 include two groups (i.e., breakage detection circuits 361-1 and 361-2).

If an abnormality (abnormal state) is detected by the abnormality detection circuit, a signal (i.e., an abnormality notification signal) that indicates the abnormality is transmitted to the power shutoff circuit 363 of the apparatus body. The abnormality notification signal issued in a state where the fixing apparatus 200A is attached to the apparatus body is constituted by two types of signals: a SAFE1 signal 366 and a SAFE2 signal 367. The SAFE1 signal 366 is an OR output signal produced from detection output signals from the abnormal-temperature detection circuits 362-1 to 362-3, a detection output signal from the crack detection circuit 360-1, and a detection output signal from the breakage detection circuit 361-1. The SAFE2 signal 367 is an OR output signal produced from detection output signals from the abnormal-temperature detection circuits 362-4 to 362-6, a detection output signal from the crack detection circuit 360-2, and a detection output signal from the breakage detection circuit 361-2.

If the abnormality notification signal is issued as the SAFE1 signal 366 or the SAFE2 signal 367, the power shutoff circuit 363 of the apparatus body causes relays 364 and 365 to enter a non-conduction state. With this operation, the electric power supplied to the fixing apparatus 200A is shut off.

Next, advantages of the present embodiment will be described.

If a comparative example has a configuration in which the lines of the circuit have an identical capacity and the control elements of the circuit also have an identical capacity, the capacity of the lines and the capacity of the control elements will be the allowable current value of the power supply path B, which corresponds to the group 1 of fixing apparatus in which the current flows most. In general, a control element that has a larger allowable current value has a larger size. Thus, if all the power supply paths use control elements that has larger capacity, the power supply unit will be upsized, upsizing the image forming apparatus. In addition, a line that has a larger allowable current value is commonly made thicker, and deteriorates in flexibility. Thus, if the line is disposed in the image forming apparatus body, the space required for the line increases, which will also upsize the apparatus. In the present embodiment, however, since the allowable current value of a line and an element is changed in accordance with the maximum current value of a corresponding group, and the line and the element with an appropriate allowable current value are used, the upsizing of the apparatus can be prevented.

In addition, since the abnormality detection circuit is disposed in the fixing apparatus 200A, the apparatus body has only to includes a necessary circuit in accordance with the number of the groups. Thus, the upsizing of the apparatus can be prevented.

Fixing Apparatus 200B

Next, a second type of fixing apparatus 200B illustrated in FIG. 5 will be described. The second type of fixing apparatus 200B is another fixing apparatus that the image forming apparatus of the present embodiment supports. In the fixing apparatus 200B, a heater 500 includes two groups (i.e., a group 4 and a group 5) of heating elements. The fixing apparatus 200B has the same configuration as that of the fixing apparatus 200A, except for the detail of the heater 500 (e.g., heating elements and a wiring pattern for the heating elements). Thus, an identical element is given an identical reference symbol, and the description thereof will be omitted.

Figure 5:
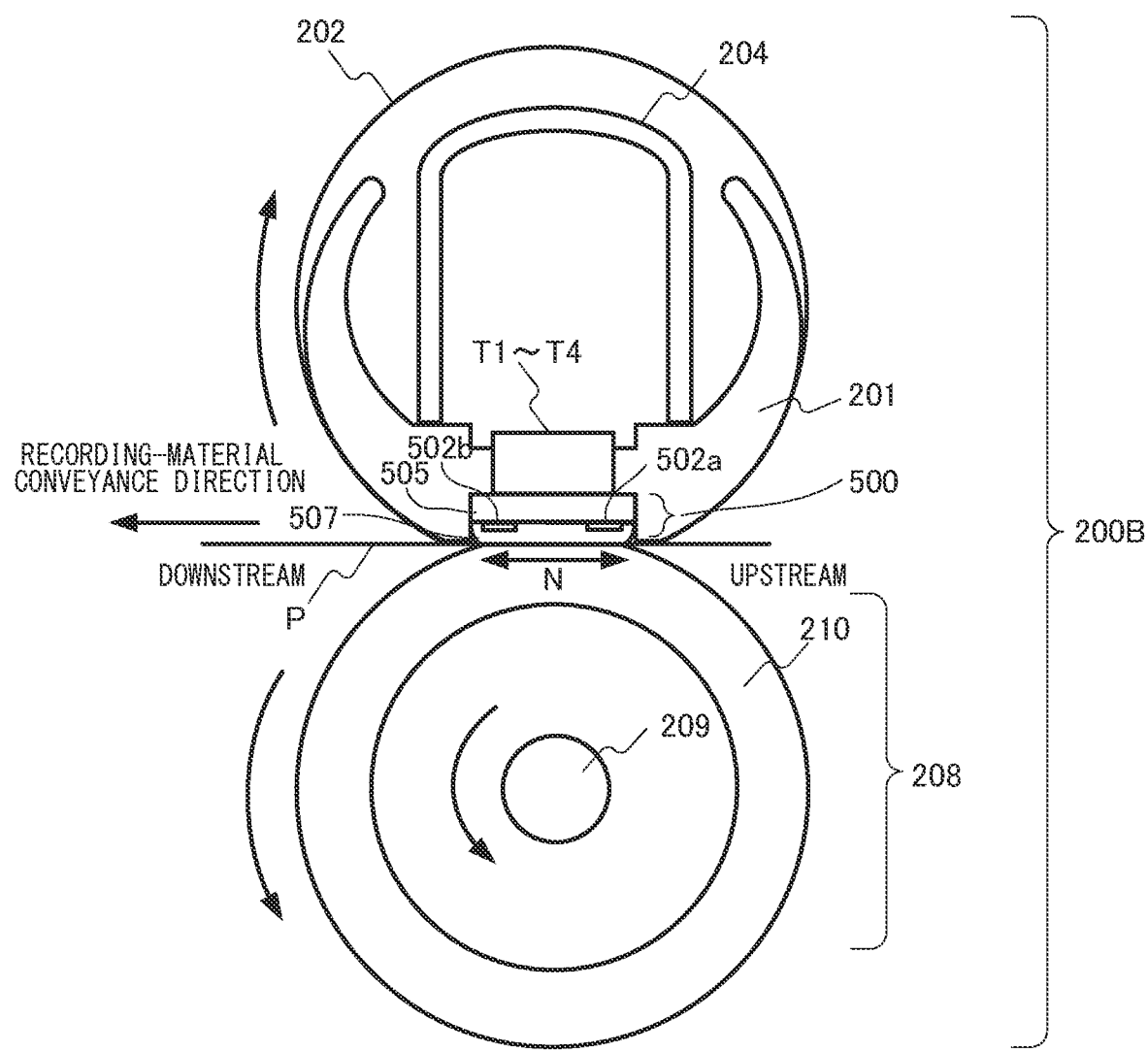
FIG. 5 is a schematic diagram illustrating a fixing apparatus 200B of the first embodiment.

As illustrated in FIG. 5, in the heater 500 of the fixing apparatus 200B, heating elements 502a and 502b and a protective layer 507 are formed on a surface of a board 505 on the fixing nip portion N side. The thermistor for detecting the temperature of the heater 500 is not disposed in the heater 500. That is, independent thermistors T1 to T3 are in contact with a surface of the board 505 opposite to the fixing nip portion N.

Heater 500

Figure 6A:
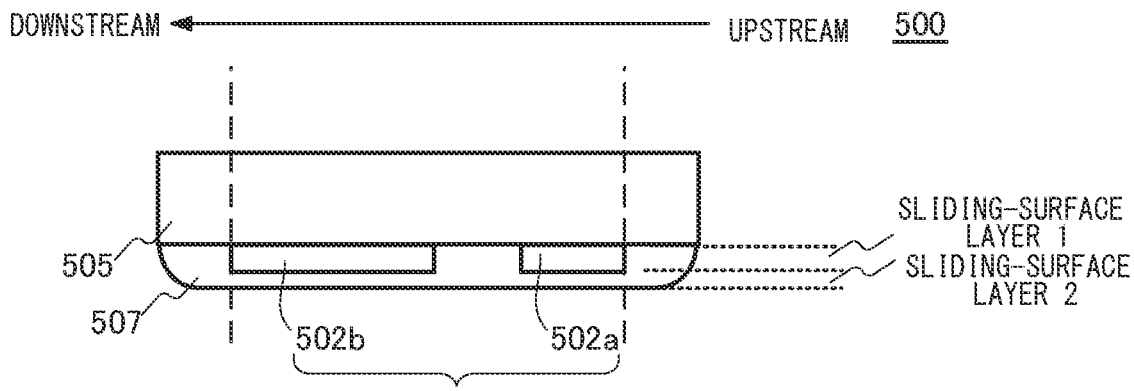
FIG. 6A is a cross-sectional view of a heater 500 of the first embodiment.
Figure 6B:
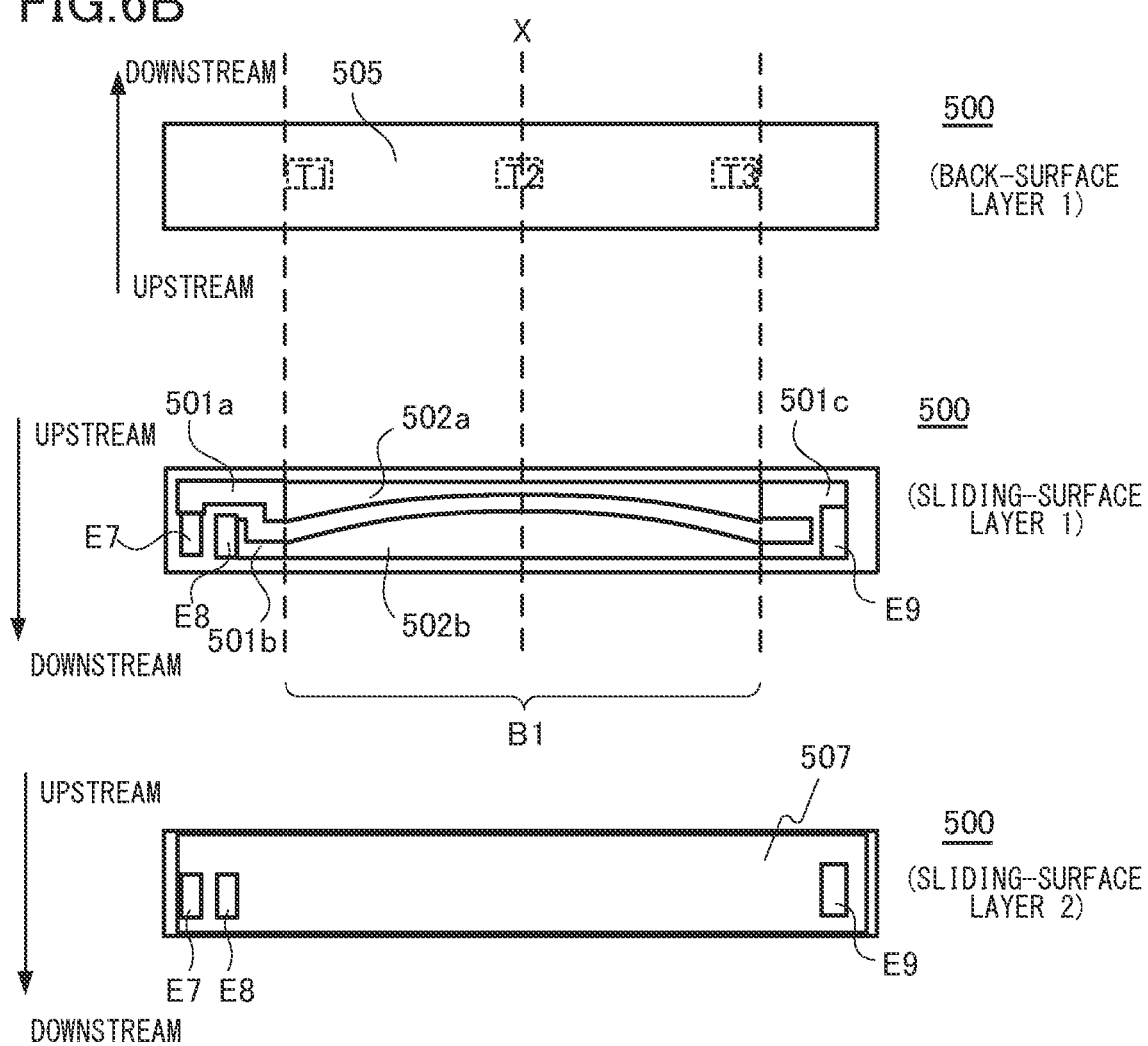
FIG. 6B is a plan view of each layer of the heater 500 of the first embodiment.

Next, with reference to FIGS. 6A and 6B, a configuration of the heater 500 of the fixing apparatus 200B will be described. FIG. 6A is a cross-sectional view of the heater 500, and FIG. 6B is a plan view of each layer of the heater 500. The cross-sectional view illustrates a cross section of the heater, taken at the above-described conveyance reference position indicated by a symbol X in FIG. 6B.

The heater 500 includes the board 505 made of ceramic, a sliding-surface layer 1, and a sliding-surface layer 2. The sliding-surface layer 1 is formed on a surface of the board 505 on the fixing nip portion N side, and the sliding-surface layer 2 covers the sliding-surface layer 1.

In the sliding-surface layer 1, independently-driven two groups of heating elements 502a (group 4) and 502b (group 5) are disposed substantially in parallel with each other in the longitudinal direction. The distribution in the longitudinal direction of heat generated by the heating element 502b (that belongs to one of the two groups) and the distribution in the longitudinal direction of heat generated by the heating element 502b (that belongs to the other of the two groups) are different from each other. The heating element 502a generates heat such that the amount of heat generated by a center portion of the heating element 502a in the longitudinal direction is larger than the amount of heat generated by an end portion of the heating element 502a in the longitudinal direction. The heating element 502b generates heat such that the amount of heat generated by an end portion of the heating element 502b in the longitudinal direction is larger than the amount of heat generated by a center portion of the heating element 502b in the longitudinal direction. That is, the fixing apparatus 200B in which the heater 500 is disposed is the same type of fixing apparatus as that described in Japanese Patent Application Publication No. H10-177319. Both of the heating elements 502a and 502b have a longitudinal width of 220 mm. Thus, the second type of fixing apparatus (the second fixing apparatus) 200B includes the heating elements 502a and 502b that serve as a second heating element, and the second heating element is divided into groups whose number is smaller than the number (three in the present embodiment) of power supply paths of the power supply circuit of the image forming apparatus body.

The heater 500 also includes electrodes (electric contacts) E7 and E8 used for supplying the electric power to the heating elements, and a common-electrode contact E9. In addition, the heater 500 also includes conductor patterns 501a, 501b, and 501c that electrically connect the electric contacts and the heating elements.

Since the patterns are formed in this manner, an energizing path from the power-supplying electrode E7 to the common electrode E9 through the conductor pattern 501a, the heating element 502a, and the conductor pattern 501c, and an energizing path from the power-supplying electrode E8 to the common electrode E9 through the conductor pattern 501b, the heating element 502b, and the conductor pattern 501c are formed. The power-supplying electrodes E7 and E8 are disposed independently from each other, for the respective heating elements. In FIG. 6B, a heating area B1 is a heating area of the heating elements 502a and 502b.

The sliding-surface layer 2 is the protective layer 507 that has insulating property. In the present embodiment, the protective layer 507 is made of glass. The protective layer 507 covers the conductor pattern 501 and the heating element 502. The protective layer 507 is formed so as not to cover the electrodes E7 to E9. Thus, contact members (not illustrated) can be connected to the exposed electrodes E7 to E9, from the back-surface layer 2 side of the heater.

The thermistors T1, T2, and T3 are in contact with a surface (i.e., a back surface) of the board 505 opposite to the sliding-surface layer 1, and detect the temperature of the heater 500 for controlling and adjusting the temperature of the heater 500. The thermistors T1 and T3 are disposed at both end portions of the heating area B1, and the thermistor T2 is disposed at a center portion of the heating elements in the longitudinal direction. In the temperature rise of the non-sheet passing portion, the temperature detected by the thermistors T1 and T3, disposed at both end portions in the longitudinal direction, becomes higher than the temperature detected by the thermistor T2, disposed at a center portion in the longitudinal direction. Thus, by detecting the difference in temperature and changing the energization rate of the heating elements 502a and 502b, the temperature rise of the non-sheet passing portion can be reduced.

The resistance value of the heating element 502 is set so that when the image forming apparatus is connected to a commercial alternating-current power supply of 120 V, the heating element 502 outputs 1440 W, as a whole. That is, in a case where the heating elements of the heating element 502 are connected in parallel with each other, the combined resistance of the heating elements is 10Ω. In addition, the resistance value of the heating element 502a of the group 4 is 19.5Ω, and the resistance value of the heating element 502b of the group 5 is 20.5Ω.

Since the resistance values of the heating elements 502a and 502b of the respective groups are different from each other, currents that flow in the heating elements 502a and 502b of the respective groups have values different from each other. In the present embodiment, the maximum alternating-current voltage applied to the apparatus is 140 V. Thus, when the maximum alternating-current voltage is supplied to the apparatus, the maximum current that flows in the group 4 is 7.2 A, and the maximum current that flows in the group 5 is 6.8 A. Note that in general, the maximum current that flows in each group is proportional to the rated current of the group (the rated current is a current that flows in a heating element when the heating element is supplied with a rated voltage of 120 V). Thus, the rated current of the group 5 is smaller than the rated current of the group 4.

Power Supply Circuit in case where Fixing Apparatus 200B is attached to Image Forming Apparatus Next, a circuit configuration of the apparatus body of the image forming apparatus 10 and the fixing apparatus 200B in a case where the second type of fixing apparatus 200B is attached to the image forming apparatus 10 of the present embodiment will be described. The image forming apparatus 10 of the present embodiment includes three power supply paths that can control and supply the electric power independently; while the fixing apparatus 200B includes the two groups of heating elements, as described above. That is, the fixing apparatus 200B includes heating elements of groups whose number is smaller than the maximum number of groups that the image forming apparatus 10 can support.

Figure 7:
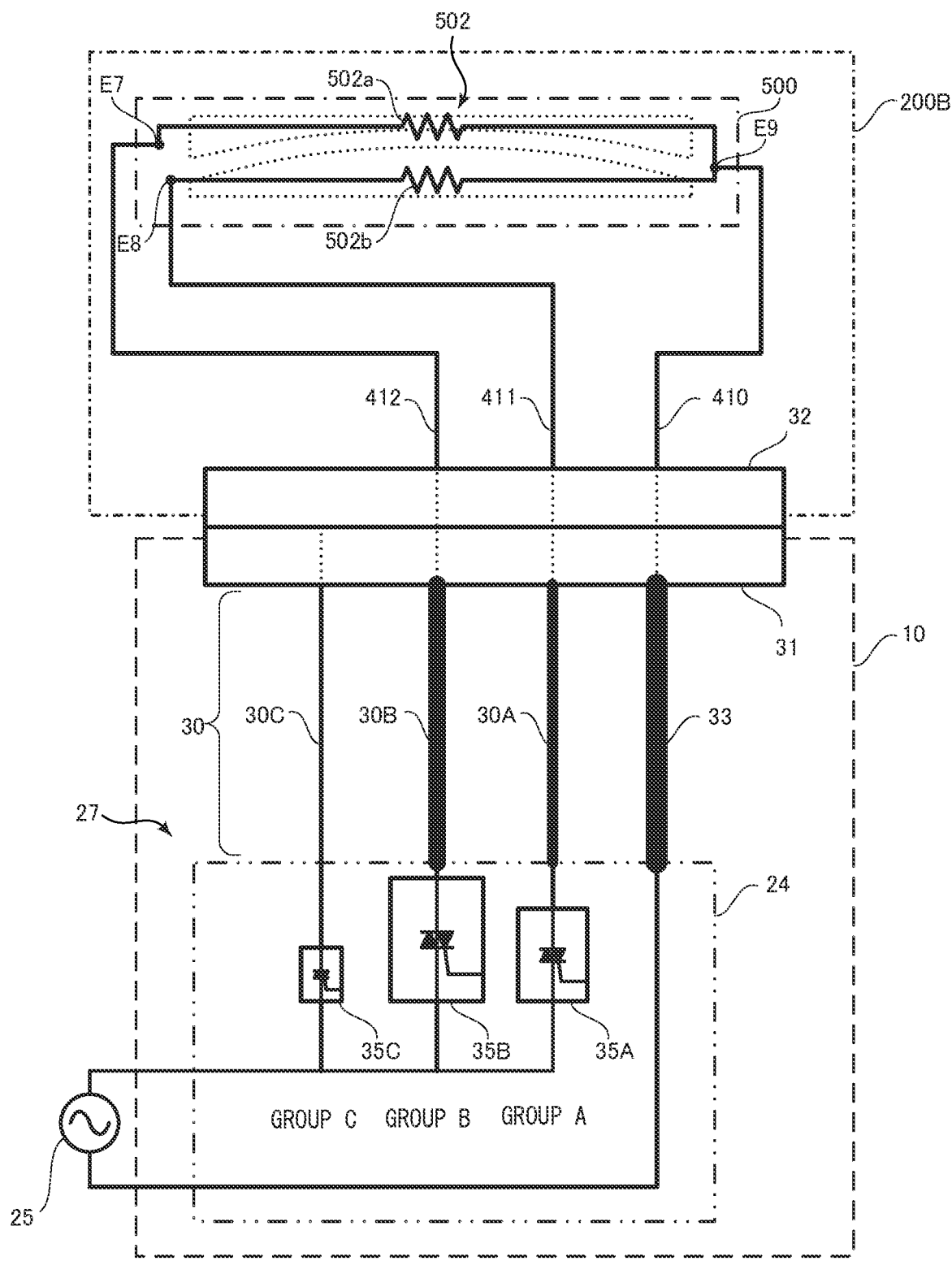
FIG. 7 is a diagram illustrating a circuit configuration in which the fixing apparatus 200B is attached to the image forming apparatus of the first embodiment.

FIG. 7 illustrates a circuit configuration, in the same form as that of FIG. 4, in which the electric power is supplied to the heating elements (i.e., the heating element 502a of the group 4 and the heating element 502b of the group 5) of the respective groups disposed in the heater 500 of the fixing apparatus 200B. In FIG. 7, a circuit configuration of the apparatus body of the image forming apparatus 10 is indicated by a broken line, and a circuit configuration of the fixing apparatus 200B is indicated by a dot-and-dash line. Power lines 30A to 30C of the apparatus body of the image forming apparatus 10 and power lines 411 and 412 of the fixing apparatus 200B are electrically continuous with each other, via the connection between the connector 31 of the apparatus body and the connector 32 of the fixing apparatus 200B.

In addition, in FIG. 7, a circuit configuration of the power supply unit 24, included in the image forming apparatus 10 and serving as a power supply circuit, is indicated by a dot-dot-dash line; and a circuit configuration of the heater 500, included in the fixing apparatus 200B, is indicated by a dot-dash-dash line. Note that the circuit configuration of the heater 500 is illustrated in a circuit form of the heater 500, which is illustrated in FIGS. 6A and 6B. Each of the heating elements 502a and 502b is illustrated as a resistor. Since the circuit configuration of the apparatus body is the same as that illustrated in FIG. 4, the detailed description thereof will be omitted.

The fixing apparatus 200B includes the power lines 411 and 412, each of which connects a terminal of the connector 32 and a heating element (of the heating element 502) of a corresponding group. The electric power supplied from the power supply circuit 27 of the image forming apparatus is supplied to the heating elements 502a and 502b of the respective groups through the power lines 411 and 412. In FIG. 7, the power line 411 of the fixing apparatus is connected to the heating element 502b of the group 5, and the power line 412 of the fixing apparatus is connected to the heating element 502a of the group 4. In addition, a common line 410 is disposed in the fixing apparatus.

The fixing apparatus 200B includes the common line 410. When a contact terminal connected with the common line 410 is brought into contact with a contact terminal connected with the common line 33 in the connectors 31 and 32, a circuit for supplying the electric power from the alternating-current power supply 25 to the heating element 502 is completed. The common line 410 is used for the two groups of power supply paths.

Next, a method of connecting each of the power supply paths of the power supply circuit 27 of the apparatus body and a heating element of a corresponding group of the fixing apparatus will be described. In the present embodiment, when the fixing apparatus 200B having less groups is attached to the apparatus body, only one part of the three groups of power supply paths (the power supply path A, the power supply path B, and the power supply path C) of the power supply circuit 27 of the apparatus body is used. The rest of the three groups of power supply paths is a surplus circuit, and is not connected to the circuit of the fixing apparatus 200B in a state where the fixing apparatus 200B is attached to the apparatus body.

Thus, when the fixing apparatus 200B, in which the number of the groups of heating elements is smaller than the number of the power supply paths of the power supply circuit 27, is attached to the apparatus body, only one part of the power supply paths is electrically connected with the heating elements of the fixing apparatus 200B. In this configuration, it is not necessary for the apparatus body to include a power supply circuit that includes three power supply paths, and another power supply circuit that includes two power supply paths, for supporting each type of fixing apparatuses. Thus, the number of power lines and control elements can be reduced, and the image forming apparatus can be downsized.

Preferably, when the fixing apparatus 200B having less groups of heating elements is attached to the apparatus body, at least the power supply path (that is the power supply path B in the present embodiment) in which the power line has the largest allowable current value is connected to a heating element of the fixing apparatus 200B. Similarly, it is preferable that when the fixing apparatus 200B having less groups of heating elements is attached to the apparatus body, at least the power supply path (that is the power supply path B in the present embodiment) in which the control element has the largest allowable current value is connected to a heating element of the fixing apparatus 200B. Thus, it is possible to drive the fixing apparatus 200B by using the power line 30B or the control element (i.e., the triac 35B), which have relatively large allowable current values.

In contrast, it is preferable that when the fixing apparatus 200B having less groups of heating elements is attached to the apparatus body, the power supply group (that is the power supply path C in the present embodiment) in which the power line has the smallest allowable current value is a surplus group, which is not connected to the fixing apparatus 200B. Similarly, it is preferable that when the fixing apparatus 200B having less groups of heating elements is attached to the apparatus body, the power supply group (that is the power supply path C in the present embodiment) in which the control element has the smallest allowable current value is a surplus path, which is not connected to the fixing apparatus 200B. Thus, it is possible to drive the fixing apparatus 200B by effectively using the power supply group that has larger allowable current value, and by not using the surplus power line 30C or control element (i.e., the triac 35C) that has smaller allowable current value.

Furthermore, it is preferable that if the fixing apparatus 200B has less groups of a plurality of heating elements, the groups of heating elements in the descending order of the maximum current value are associated with the groups of the power supply circuit 27 in the descending order of the allowable current value of the power line and the control element. Specifically, the heating element 502a of the group 4 of the fixing apparatus 200B, which has a larger maximum current value, is connected, via the power line 412, to the power line 30B of the power supply path B of the apparatus body, in which the power line 30B and the triac 35B have the largest allowable current value. In addition, the other power line 411 of the other group 5 is connected to the power line 30A of the power supply path A of the apparatus body, in which the power line 30A and the triac 35A have the second largest allowable current value.

Setting of Allowable Current

Next, setting of the allowable current value of a power supply path used by one of a plurality of types of fixing apparatuses will be described. The setting is performed in a case where the power supply circuit 27 of the image forming apparatus 10 includes a plurality of power supply paths.

As described above, the power supply paths A and B of the power supply circuit 27 are used by any one of the two types of fixing apparatuses 200A and 200B, whereas the power supply path C is used by the fixing apparatus 200A alone.

The setting of the allowable current value of the power supply path A of the power supply circuit 27 is performed, as described below, in a state where the fixing apparatus 200A having more groups is attached to the apparatus body (FIG. 4). The allowable current value of the power line 30A of the power supply path A is 7.5 A, and the allowable current value of the control element (i.e., the triac 35A) is 8 A. In addition, the maximum current value of the heating element 502a of the group 2 of the fixing apparatus 200A, which corresponds to the power supply path A, is 2.5 A. In comparison between the allowable current value and the maximum current value, the allowable current value of the power line and the control element of the image forming apparatus body is equal to or larger than three times the maximum current value of the heating element that corresponds to the power line and the control element. In addition, the allowable current value of the power line and the control element of the image forming apparatus body is larger than the maximum current value of the heating element that corresponds to the power line and the control element, by 5 A or more. Thus, since the power line and the control element of the power supply path A have excessive allowable current values, the apparatus body can easily support the fixing apparatus 200B having less groups.

This is because in the fixing apparatus having less groups, the amount of heat generated by one group may be set larger than that in the fixing apparatus having more groups, and thus the maximum current value of the one group may be made larger. Actually, in a state where the fixing apparatus having less groups and illustrated in FIG. 7 is attached to the apparatus body, the maximum current value of the group 5 connected to the power supply path A is 6.8 A, which is larger than the maximum current value of 2.5 A of the group that is connected to the power supply path A, and that is of the fixing apparatus having more groups and illustrated in FIG. 4.

That is, it is preferable that the allowable current value of the power line and the control element of the power supply path Abe set excessively for allowing the power supply path A to be used also by the fixing apparatus 200B when the fixing apparatus 200B having less groups is attached to the apparatus body. In other words, the allowable current value of the power line or the control element of at least one of a plurality of power supply paths of the image forming apparatus body is set equal to or larger than three times the maximum current value of the heating element of the group of the fixing apparatus 200A that corresponds to the power supply path. In other words, the allowable current value of the power line or the control element of the power supply path is set larger by 5 A or more, than the maximum current value of the heating element of the group of the fixing apparatus 200A that corresponds to the power supply path. Thus, although one part of the power supply paths has an excessive allowable current value for the fixing apparatus 200A attached to the apparatus body, the power supply path can be used also for the fixing apparatus 200B having less groups.

Configuration of Safety Circuit of Fixing Apparatus 200B

Figure 13:
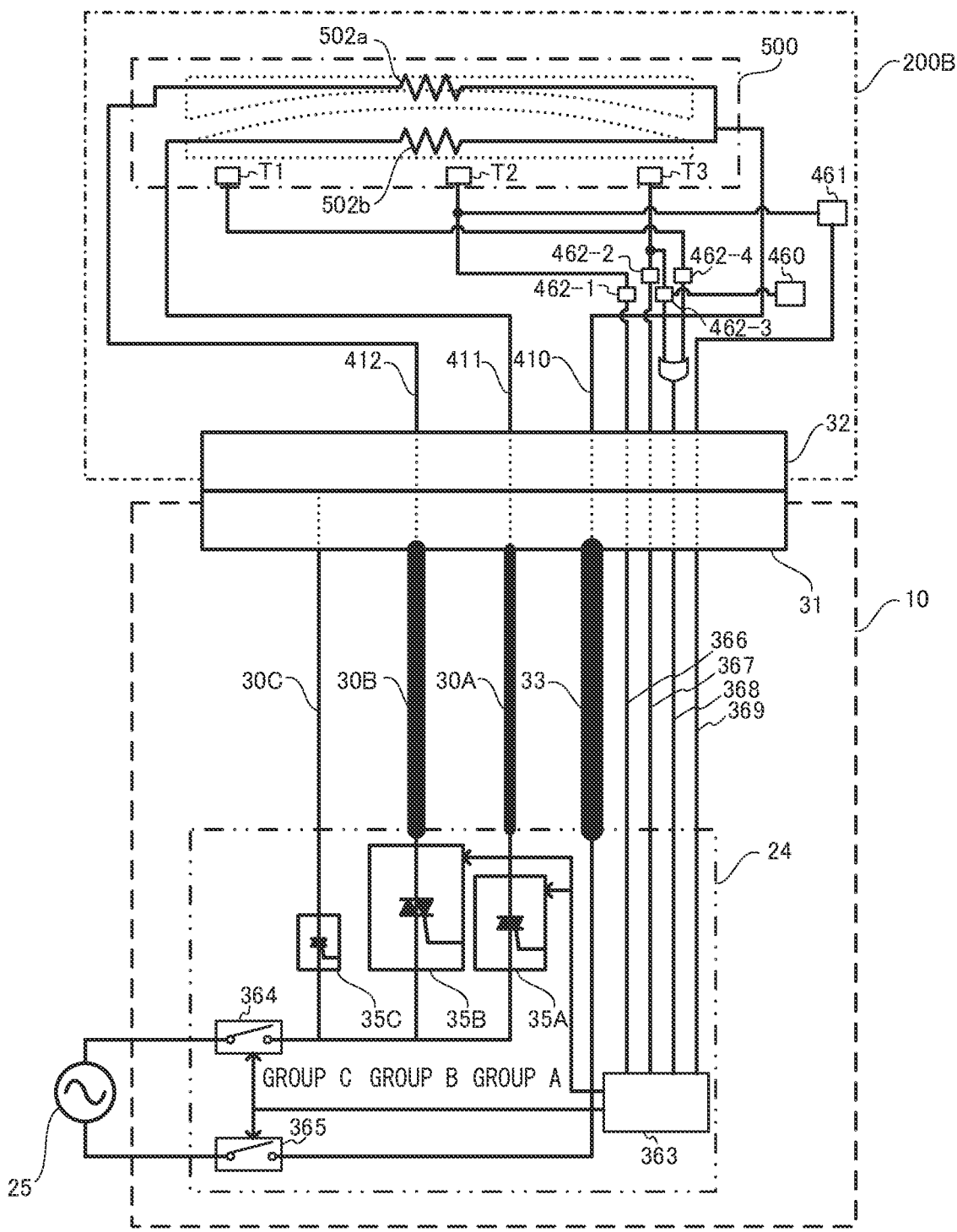
FIG. 13 is a diagram illustrating a safety circuit of the fixing apparatus 200B of the first embodiment.

Next, a configuration of a safety circuit that corresponds to the fixing apparatus 200B of the present embodiment will be described with reference to FIG. 13. The safety circuit includes an abnormality detection circuit disposed in the fixing apparatus 200B, and a power shutoff circuit 363 disposed in the image forming apparatus body.

Preferably, the abnormality detection circuit disposed in the fixing apparatus has a configuration that corresponds to the number of the power supply paths of the power supply circuit. The fixing apparatus 200B includes an abnormal-temperature detection circuit, a rotation detection circuit 460, and a current-detection-threshold switching circuit 461, which serve as the abnormality detection circuit. In the abnormal-temperature detection circuit, the thermistors (T1 to T3) monitor the temperature of each group of heating elements, for detecting an abnormal temperature. The fixing apparatus 200B includes four abnormal-temperature detection circuits 462-1 to 462-4. The thermistors T1 to T3 function as a second temperature-detection portion that outputs a signal in accordance with the temperature of each group of the heating elements. The abnormal-temperature detection circuits 462-1 to 462-4 function as a second abnormality-detection portion that outputs an abnormality notification signal, depending on the detection signal from the second temperature-detection portion.

The rotation detection circuit 460 and the current-detection-threshold switching circuit 461 are disposed for enhancing the safety of the two groups of heating elements. The rotation detection circuit 460 detects the rotation of the pressing roller 208 disposed in the fixing apparatus. The current-detection-threshold switching circuit 461 switches the threshold of a current detection circuit in accordance with the temperature of the heating element.

If an abnormality is detected by the abnormality detection circuit, a signal (i.e., an abnormality notification signal) that indicates the abnormality is transmitted to the power shutoff circuit 363 of the apparatus body. The abnormality notification signal issued in a state where the fixing apparatus 200B is attached to the apparatus body is constituted by four types of signals: a SAFE1 signal 366, a SAFE2 signal 367, a SAFE3 signal 368, and a SAFE4 signal 369. The SAFE1 signal is a detection output signal from the abnormal-temperature detection circuit 462-1. The SAFE2 signal 367 is a detection output signal from the abnormal-temperature detection circuit 462-2. The SAFE3 signal 368 is an OR output signal produced from a detection output signal from the abnormal-temperature detection circuit 462-3 and a detection output signal from the abnormal-temperature detection circuit 462-4. The SAFE4 signal 369 is a detection output signal from the current-detection-threshold switching circuit 461.

The SAFE1 signal 366 and the SAFE2 signal 367 are used also by the fixing apparatus 200A. In other words, the signal lines for the SAFE1 signal 366 and the SAFE2 signal 367 function to transmit an abnormality notification signal sent from the first abnormality-detection portion in a state where the first fixing apparatus is attached to the image forming apparatus, and transmit an abnormality notification signal sent from the second abnormality-detection portion in a state where the second fixing apparatus is attached to the image forming apparatus.

If an abnormality is detected by using the SAFE1 signal, the SAFE2 signal, and the SAFE4 signal, the power shutoff circuit 363 of the apparatus body causes the relays 364 and 365 to enter a non-conduction state, depending on the abnormality notification signal. In addition, for ensuring the safety against the multiple failure in the configuration of the safety circuit of the fixing apparatus 200B, the electric power can be shut off, depending on a signal sent through a path other than the paths for the SAFE1 signal, the SAFE2 signal, and the SAFE4 signal. In the present embodiment, if an abnormality is detected by using the SAFE3 signal, the power shutoff circuit 363 of the apparatus body causes the triacs 35B and 35A to enter a non-conduction state. In this manner, the electric power supplied to the fixing apparatus 200B is shut off.

Summary of Present Embodiment

As described above, in the present embodiment, part of a plurality of power supply paths of the power supply circuit of the image forming apparatus body is used by any one of a plurality of fixing apparatuses that is selectively attached to the apparatus body. In this configuration, it is not necessary for the apparatus body to include individual power supply circuits that correspond to the types of fixing apparatuses, or to the groups of heating elements of the types of fixing apparatuses. As a result, the apparatus can be downsized.

In addition, part of the power supply paths of the image forming apparatus body, in which the power line and the control element have relatively large allowable current values, is used by any one of a plurality of fixing apparatuses. Thus, the margin of the allowable current value of the apparatus body to the value of maximum current that flows in the heating element increases, so that the safety of the apparatus can be increased.

In a state where the fixing apparatus 200B (FIG. 7) having less groups of heating elements is attached to the apparatus body, the image forming apparatus has a surplus power supply path of the power supply circuit. The surplus power supply path (power line, control element, contact terminal) is connected to a corresponding contact terminal disposed in the apparatus body, and disposed so that the electric power can be supplied, but is not connected to the heating element of the fixing apparatus. In this case, the surplus power supply path is the power supply path C, in which the power line or the triac has a small allowable current value.

In addition, in the configuration in which any one of a plurality of fixing apparatuses is selectively attached to the apparatus body, the abnormality detection circuit configured in accordance with the internal configuration of the fixing apparatus is disposed in the fixing apparatus, and the power shutoff circuit that shuts off the electric power supplied to the fixing apparatus, depending on an abnormality notification signal issued by the abnormality detection circuit, is disposed in the apparatus body. With this configuration, while the image forming apparatus can prevent the abnormal temperature rise of the fixing apparatus and keep the safety, the image forming apparatus can be made smaller than the image forming apparatus that includes power shutoff circuits for corresponding types of fixing apparatuses. For example, since the signal lines for the SAFE1 signal 366 and the SAFE2 signal 367 can be used by any one of a plurality of fixing apparatuses, the number of components (such as signal lines) can be reduced.

Second Embodiment

As in the first embodiment, an image forming apparatus 10 of the present embodiment is configured so that any one of a plurality of types (two types) of fixing apparatuses, which have different groups of heating elements, can be selectively attached to the image forming apparatus 10. Specifically, the image forming apparatus 10 of the present embodiment is configured so that a fixing apparatus 200B or a fixing apparatus 200C can be attached to the image forming apparatus 10. The fixing apparatus 200B is the same as the fixing apparatus 200B described in the first embodiment, and includes the heater 500 that includes two groups of heating elements. The fixing apparatus 200C includes only a single group of heating elements. That is, in the present embodiment, the fixing apparatus 200B that includes the heater 500, which includes the two groups of heating elements (i.e., a first heating element), is an example of a first fixing apparatus; and the fixing apparatus 200C that includes the heater, which includes the single group of heating elements (i.e., a second heating element), is an example of a second fixing apparatus. Hereinafter, a component given a reference symbol identical to a reference symbol of a component of the first embodiment has the same structure and effect as those of the component of the first embodiment, unless otherwise specified.

Figure 8A:
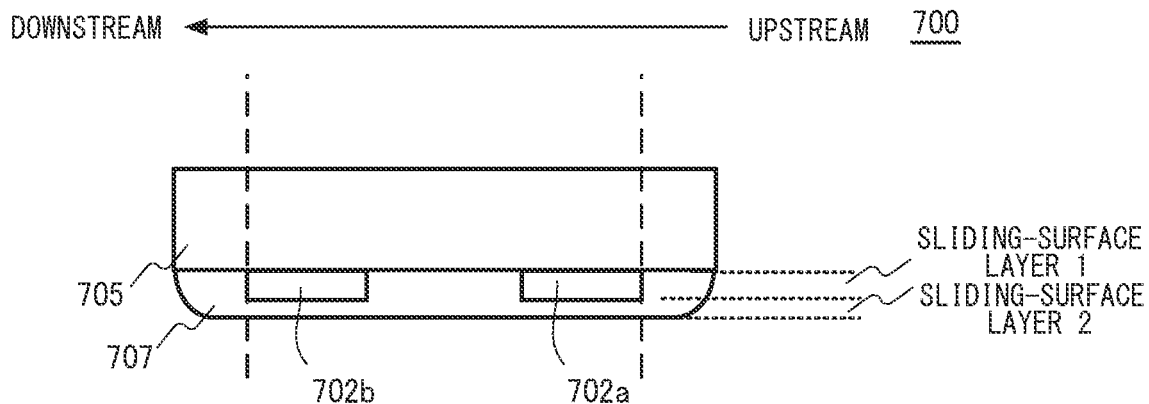
FIG. 8A is a cross-sectional view of a heater 700 of a second embodiment.

Hereinafter, a configuration of the fixing apparatus 200C that includes only the single group of heating elements will be described with reference to FIGS. 8A and 8B. FIG. 8A is a cross-sectional view of a heater 700 included in the fixing apparatus 200C, and FIG. 8B is a plan view of each layer of the heater 700.

The configuration of the heater 700 is basically the same as the configuration of the heater 500 illustrated in FIG. 6. However, the configuration of the heater 700 differs from the configuration of the heater 500 in that a single group (group 6) of heating elements 702a and 702b is formed in the sliding-surface layer 1, which is formed on a surface of a board 705 (made of ceramic) on the fixing nip portion side (that is, on a lower side in FIG. 8A). The heating element of the group 6 has a pattern with a folded shape. Specifically, in the heating element, two heating elements 702a and 702b are disposed in parallel with each other in the longitudinal direction, and are connected in series with each other via a conductor pattern 701c. Thus, the two heating elements 702a and 702b constitute a single group of heating elements.

Figure 8B:
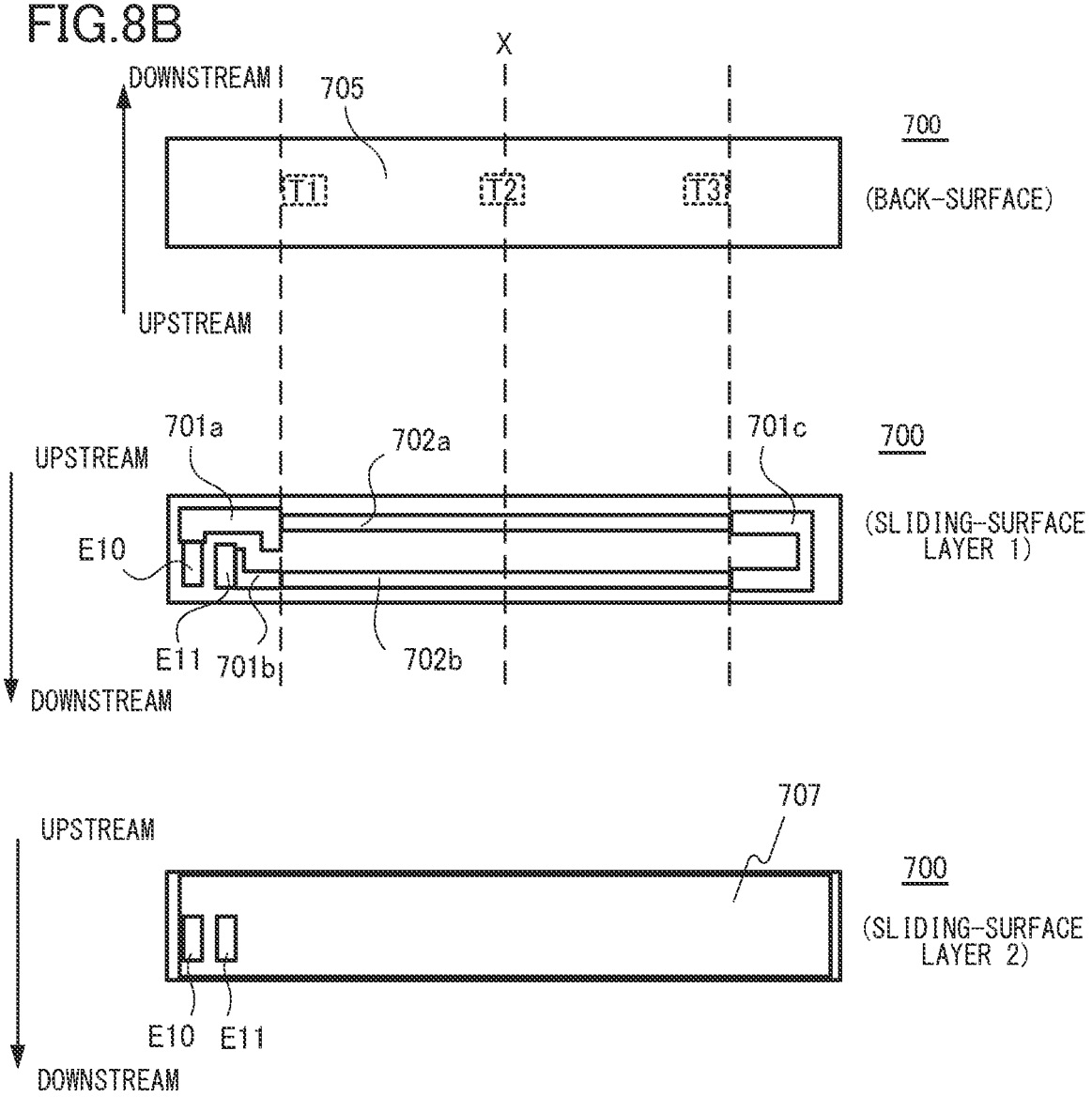
FIG. 8B is a plan view of each layer of the heater 700 of the second embodiment.

In FIG. 8B, the heater 700 includes a power-supplying electrode E10, a common electrode E11, a conductor pattern 701a that connects the heating element 702a and the power-supplying electrode E10, a conductor pattern 701b that connects the heating element 702b and the common electrode E11, and thermistors T1 to T3 that are in contact with the board 705. The heater 700 also includes an insulating glass coat (protective layer) 707.

The resistance value of the heating element of the group 6, constituted by the heating elements 702a and 702b, is 10Ω. The current value (the maximum current value) obtained when the maximum alternating-current voltage of 140 V is applied to the apparatus is 14 A.

Figure 9:
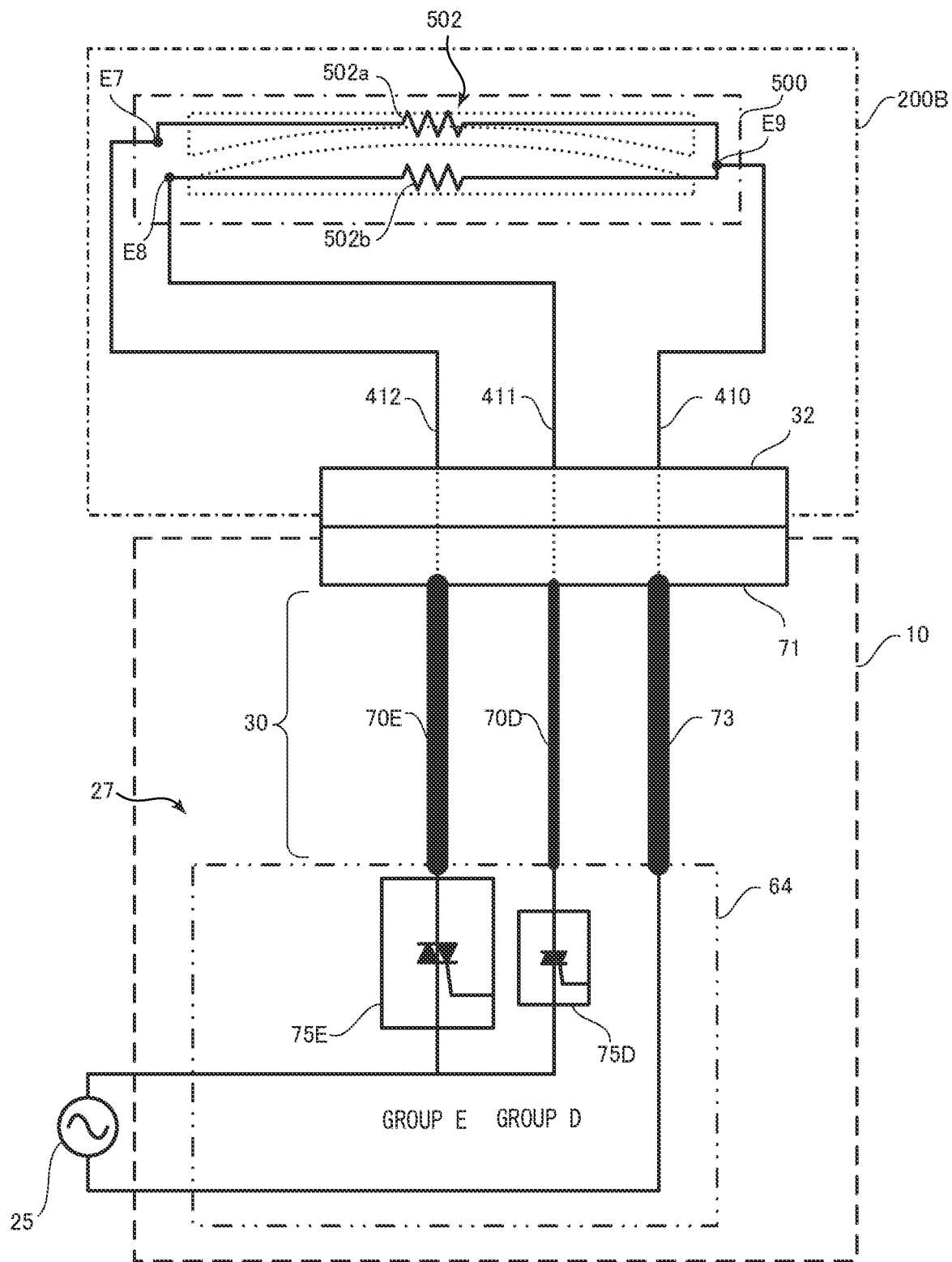
FIG. 9 is a diagram illustrating a circuit configuration in which the fixing apparatus 200B is attached to an image forming apparatus of the second embodiment.

FIG. 9 illustrates a circuit configuration, in the same form as that of FIG. 4, in which the electric power is supplied to the heating elements (i.e., the heating element 502a of the group 4 and the heating element 502b of the group 5) of the respective groups disposed in the heater 500 of the fixing apparatus 200B. In FIG. 9, a circuit configuration of the apparatus body of the image forming apparatus 10 is indicated by a broken line, and a circuit configuration of the fixing apparatus 200B is indicated by a dot-and-dash line. Power lines 70D and 70E of the apparatus body of the image forming apparatus 10 and power lines 411 and 412 of the fixing apparatus 200B are electrically continuous with each other, via the connection between a connector 71 of the apparatus body and the connector 32 of the fixing apparatus 200B.

The power supply circuit 27 of the image forming apparatus 10 includes two power supply paths. Each of the two power supply paths can independently control the electric power supplied to a corresponding heating element. Hereinafter, the power supply paths of the power supply circuit 27 are referred to as a power supply path D and a power supply path E. The circuit of the power supply path D includes a triac 75D and a power line 70D. The circuit of the power supply path E includes a triac and a power line 70E.

The power supply unit 24 distributes the electric power supplied from the commercial alternating-current power supply 25, to the power supply paths; and outputs the electric power to the power lines 70D and 70E through the triacs 75D and 75E, which serve as control elements. A control portion disposed in the image forming apparatus 10 can control the energization/shutoff of each of the triacs 75D and 75E. The power lines 70D and 70E transmit the electric power, supplied from the power supply unit 24 to the respective power supply paths, to a wire portion (i.e., the power lines 411 and 412) of the fixing apparatus 200B.

In the present embodiment, the power line 412 of the group 4 of the fixing apparatus in which the current flows more is connected to the power line 70E of the power supply path E of the apparatus body. Thus, the power line 70E is a stranded wire of AWG14 (allowable current: 19 A) that has the largest allowable current value (except for the allowable current value of the common line). In addition, the allowable current value of the triac 75E of the group 4 is 15 A. The power line 411 of the group 5 is connected to the power line 70D of the power supply path D of the apparatus body. Thus, the power line 70D is a stranded wire of AWG20 (allowable current: 7.5 A) that has an intermediate-level of allowable current value. The allowable current value of the triac 75D is 8 A.

Thus, also in the present embodiment, the power supply path of the image forming apparatus body in which the power line or the control element has the largest allowable current value corresponds to one of the groups of heating elements of the fixing apparatus that has the largest current value. With this configuration, the image forming apparatus can be made smaller than the image forming apparatus in which the power lines have an identical allowable current value and the control elements have an identical allowable current value in all power supply paths.

Figure 10:
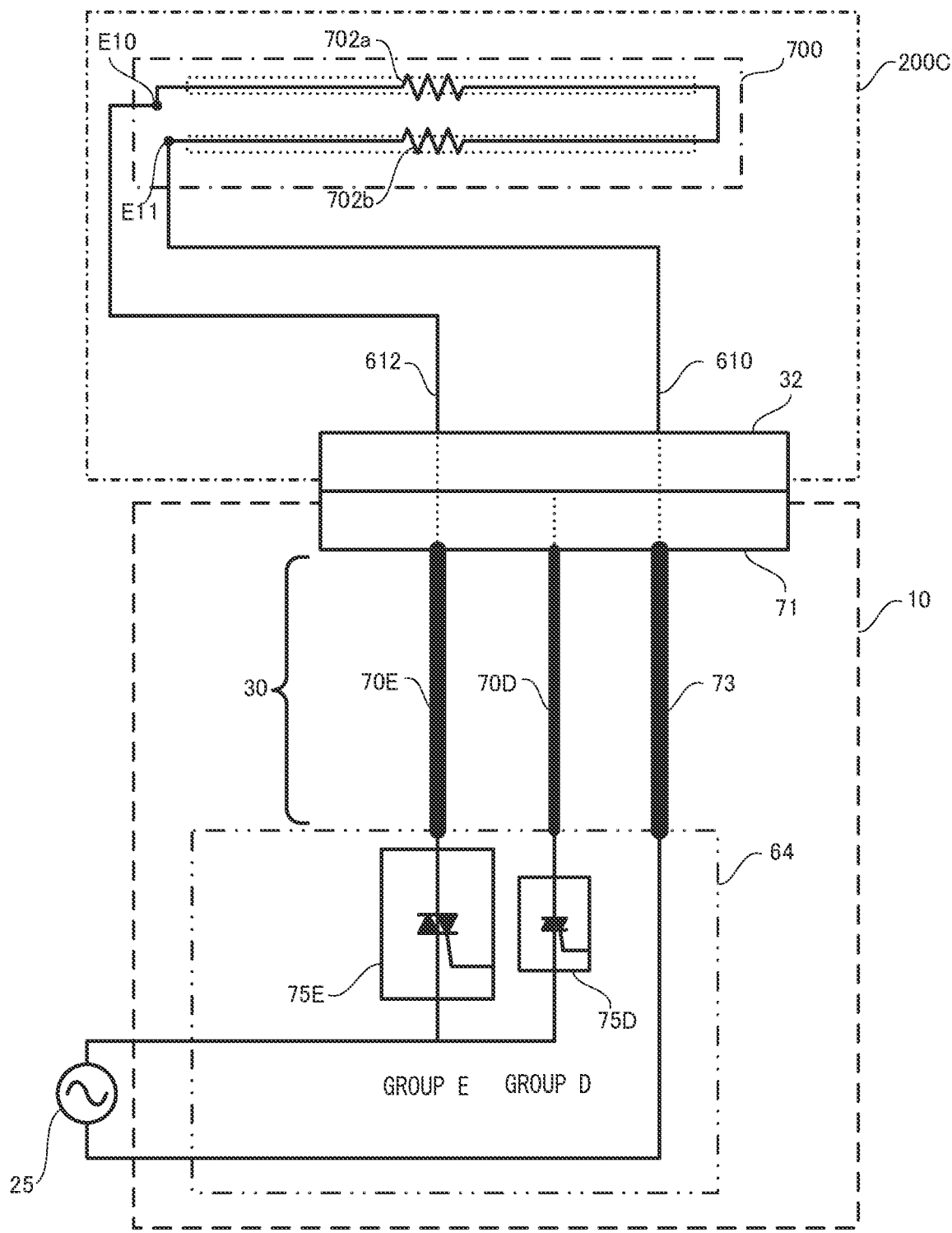
FIG. 10 is a diagram illustrating a circuit configuration in which a fixing apparatus 200C is attached to the image forming apparatus of the second embodiment.

As in FIG. 9, in FIG. 10, a circuit diagram is illustrated in which the fixing apparatus 200C that includes the single group (group 6) of heating elements is attached to the image forming apparatus of the present embodiment for supplying the electric power to the heating elements. The circuit configuration of the image forming apparatus is the same as that described with reference to FIG. 9. In the present embodiment, the heating element (group 6) of the fixing apparatus 200C is connected to the power supply path E of the power supply paths of the power supply circuit 27 of the apparatus body, which has a larger allowable current value. The power supply path D, which has a smaller allowable current value, is a surplus power supply path.

Thus, also in the present embodiment, part of a plurality of power supply paths of the power supply circuit of the image forming apparatus body is used by any one of a plurality of fixing apparatuses that is selectively attached to the apparatus body. In this configuration, it is not necessary for the apparatus body to include individual power supply circuits that correspond to the types of fixing apparatuses, or to the groups of heating elements of the types of fixing apparatuses. As a result, the apparatus can be downsized.

In addition, part of the power supply paths of the image forming apparatus body, in which the power line and the control element have relatively large allowable current values, is used by any one of a plurality of fixing apparatuses. Thus, the margin of the allowable current value of the apparatus body to the value of maximum current that flows in the heating element increases, so that the safety of the apparatus can be increased.

In a state where the fixing apparatus 200C (FIG. 10) having less groups of heating elements is attached to the apparatus body, the image forming apparatus has a surplus power supply path of the power supply circuit. In this case, the surplus power supply path is the power supply path D, in which the power line or the triac has a small allowable current value.

In addition, also in the present embodiment, the allowable current value (the power line: 19 A, the triac: 15 A) of the power supply path E of the apparatus body is set excessively larger by 5 A or more, than the maximum current value (7.2 A) of the group 4 connected to the power supply path E in a state where the fixing apparatus 200B having more groups is attached to the apparatus body as illustrated in FIG. 9.

Thus, the power supply path can be used also by the fixing apparatus 200C having less groups.

Third Embodiment

In the present embodiment, in a state where a fixing apparatus having less groups is attached to the apparatus body, the electric power supplied from one of a plurality of power supply paths of the power supply circuit is joined in the fixing apparatus, with the electric power supplied from another of the plurality of power supply paths, and the resultant electric power is supplied to a single group of heating elements. Hereinafter, a component given a reference symbol identical to a reference symbol of a component of the first embodiment has the same structure and effect as those of the component of the first embodiment, unless otherwise specified.

An image forming apparatus of the present embodiment is configured so that a fixing apparatus 200B or a fixing apparatus 200D can be attached to the image forming apparatus. The fixing apparatus 200B includes two groups of heating elements, and the fixing apparatus 200D includes a single group of heating elements.

Figure 11:
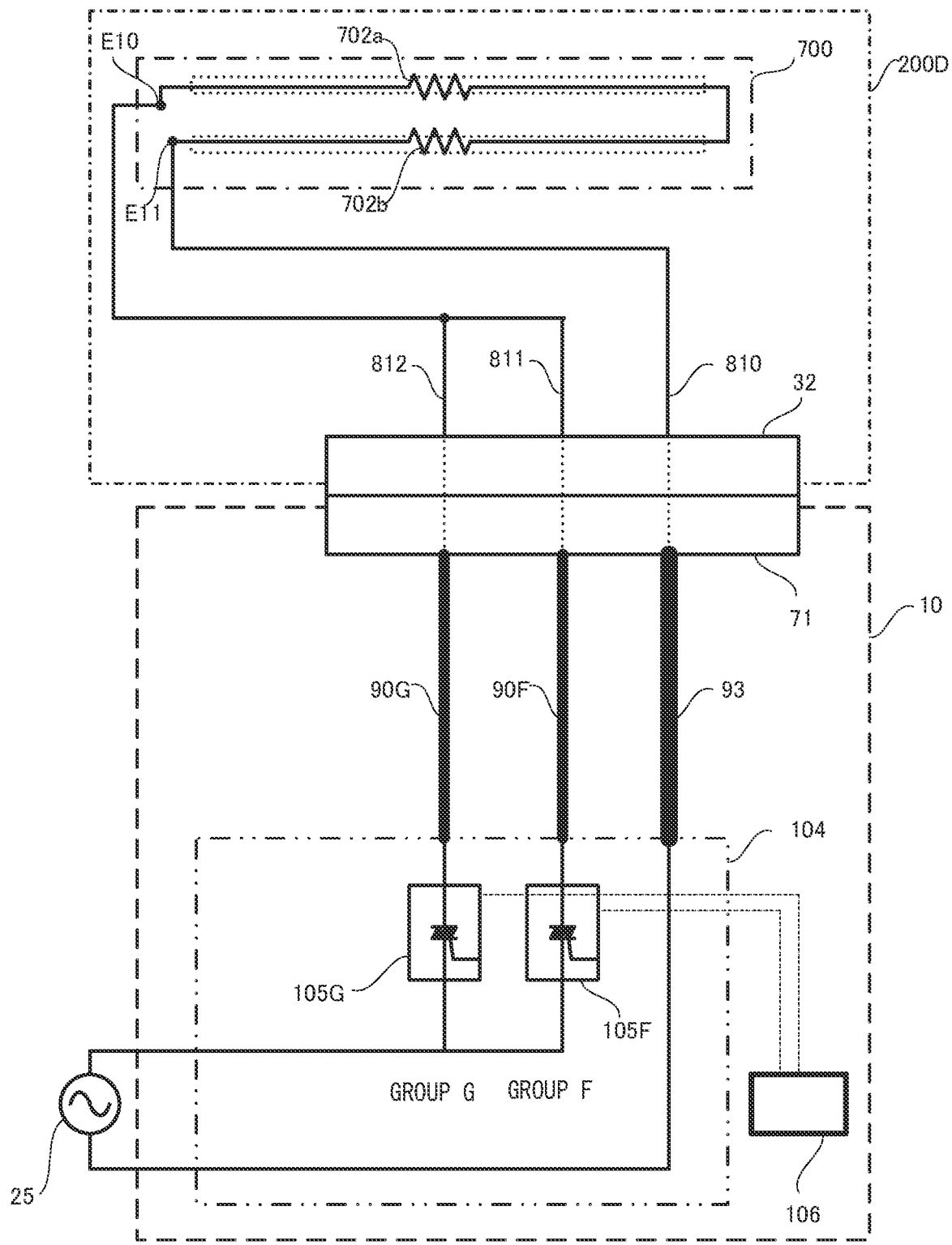
FIG. 11 is a diagram illustrating a circuit configuration in which a fixing apparatus 200D is attached to an image forming apparatus of a third embodiment.

FIG. 11 illustrates a circuit configuration, in the same form as that of FIG. 10, in which the electric power is supplied to the heating elements in a state where the fixing apparatus 200D is attached to the image forming apparatus of the present embodiment. Like the fixing apparatus 200C illustrated in FIG. 10, the fixing apparatus 200D includes a heater 700 that includes a single group (group 6) of heating elements 702a and 702b. However, the fixing apparatus 200D differs from the fixing apparatus 200C in the wiring between the heating elements, 702a and 702b, and the connector 32. Specifically, in the fixing apparatus 200C illustrated in FIG. 10, the single power line 612 (of the fixing apparatus) is connected to the power supply path E of the apparatus body. In the fixing apparatus 200D of the present embodiment, however, two power lines 811 and 812 join with each other. In other words, a plurality of power supply paths (a power supply path F and a power supply path G) of the apparatus body join with each other in the fixing apparatus having less groups of heating elements, and are connected with the single group of heating elements 702a and 702b.

The configuration of the power supply circuit of the apparatus body of an image forming apparatus 10 is substantially the same as that of the image forming apparatus 10 illustrated in FIG. 10. However, the power line and the control element (triac) have different allowable current values. In the present embodiment, power lines 90F and 90G of the two power supply paths (the power supply path F and the power supply path G) of the apparatus body are stranded wires of AWG20 (allowable current: 7.5 A), and the allowable current value of both of the triacs 105F and 105G is 8 A. That is, the allowable current value of the power line or the control element of part of the power supply paths is made smaller than that in the image forming apparatus illustrated in FIG. 10.

Furthermore, in the present embodiment, in a case where the fixing apparatus 200B having more groups is attached to the apparatus body, a control portion 106, which controls the operation (ON/OFF) of the triacs, controls the triacs of the power supply paths F and G, independently. However, in a case where the fixing apparatus 200D having less groups is attached to the apparatus body, the control portion 106 synchronizes the operation of the triacs of at least part of the power supply paths (i.e., the triacs of the power supply paths F and G in the present embodiment) connected to an identical heating element, and performs the same control on the triacs.

With this operation, the two power supply paths of the power supply circuit can apparently be handled as a single power supply path that has a large allowable current value.

In the configuration described above, the present embodiment not only has the same advantage as that of the second embodiment, but also produces no surplus power line in the power supply circuit of the apparatus body and can effectively use the power line, even in a case where the fixing apparatus having less groups of heating elements is attached to the apparatus body. In addition, by joining one power supply path with another, the present embodiment allows the apparatus body to support the fixing apparatus which has less groups of heating elements, and in which the current flows more in a single group (that is, the heating element has a lower resistance value). Thus, the allowable current value of the power line or the control element can be made smaller than that in the circuit configuration of the apparatus body of the image forming apparatus 10 of FIG. 10. Consequently, the image forming apparatus can be further downsized.

Other Modifications

The configuration of the image forming apparatus 10 is not limited to the configuration illustrated in FIG. 1. For example, the image forming apparatus 10 may be a color-image forming apparatus that includes a plurality of process cartridges, as the image forming portion. In addition, although FIG. 1 illustrates a configuration of the direct-transfer system, the image forming apparatus may have a configuration (i.e., an intermediate transfer system) in which a toner image formed on an image bearing member is primary-transferred to an intermediate transfer member, such as an intermediate transfer belt, and then the toner image is secondary-transferred from the intermediate transfer member to a recording material. In addition, the image forming apparatus may be configured so that any one of three or more types of fixing apparatuses can be selectively attached to the image forming apparatus.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091353, filed on Jun. 6, 2022, which is hereby incorporated by reference herein in its entirety.

What is claimed is:
1. An image forming apparatus comprising:
an attachment portion to which any one of a first fixing apparatus and a second fixing apparatus is selectively attached; and
a power supply circuit including a plurality of power supply paths by which electric power is supplied to the first fixing apparatus or the second fixing apparatus attached to the attachment portion, the plurality of power supply paths being configured to control the electric power independently from each other,
wherein each of the plurality of power supply paths includes a power line configured to transmit electric power, wherein the first fixing apparatus includes a plurality of first heating elements configured to generate heat when energized, the plurality of first heating elements is grouped into a plurality of groups configured to receive power supply independently from each other, and a number of the plurality of groups is equal to a number of the plurality of power supply paths, wherein the second fixing apparatus includes at least one second heating element configured to generate heat when energized, and the at least one second heating element is grouped into at least one group whose number is smaller than the number of the power supply paths, and wherein in a state where the second fixing apparatus is attached to the image forming apparatus, a power supply path of the plurality of power supply paths in which the power line has a largest allowable current value is electrically connected with the at least one second heating element.

2. The image forming apparatus according to claim 1, wherein each of the power supply paths includes a control element configured to control the electric power supplied to the first fixing apparatus or the second fixing apparatus, and wherein in a state where the second fixing apparatus is attached to the image forming apparatus, a power supply path of the plurality of power supply paths in which the control element has a largest allowable current value is electrically connected with the at least one second heating element.

3. The image forming apparatus according to claim 1, wherein in a power supply path of the plurality of power supply paths that is electrically connected with the at least one second heating element, an allowable current value of the power line is equal to or larger than three times a maximum current value of a group of the plurality of groups that corresponds to the power supply path, or is larger the maximum current value by 5 A or more.

4. The image forming apparatus according to claim 1, wherein in a state where the second fixing apparatus is attached to the image forming apparatus, one part of the plurality of power supply paths is electrically connected with the at least one second heating element, and another part of the plurality of power supply paths is not electrically connected with the at least one second heating element.

5. The image forming apparatus according to claim 1, wherein in a state where the second fixing apparatus is attached to the image forming apparatus, a power supply path of the plurality of power supply paths in which the power line has a smallest allowable current value is not electrically connected with the at least one second heating element.

6. The image forming apparatus according to claim 1, wherein a power supply path of the plurality of power supply paths that is electrically connected in a state where the first fixing apparatus is attached to the image forming apparatus, with a group of the plurality of groups that has a largest resistance value is not electrically connected with the at least one second heating element in a state where the second fixing apparatus is attached to the image forming apparatus.

7. The image forming apparatus according to claim 1, wherein the first fixing apparatus further includes a first temperature-detection portion configured to issue a detection signal in accordance with a temperature of the first heating elements, and a first abnormality-detection portion configured to issue an abnormality notification signal depending on the detection signal from the first temperature-detection portion, wherein the second fixing apparatus further includes a second temperature-detection portion configured to issue a detection signal in accordance with a temperature of the second heating element, and a second abnormality-detection portion configured to issue an abnormality notification signal depending on the detection signal from the second temperature-detection portion, wherein the image forming apparatus further includes a signal line configured to transmit an abnormality notification signal sent from the first abnormality-detection portion in a state where the first fixing apparatus is attached to the image forming apparatus, and transmit an abnormality notification signal sent from the second abnormality-detection portion in a state where the second fixing apparatus is attached to the image forming apparatus, and a power shutoff portion configured to shut off the electric power supplied to the first fixing apparatus or the second fixing apparatus, the power shutoff portion being configured to shut off the electric power if an abnormality notification signal is transmitted to the power shutoff portion through the signal line.

8. The image forming apparatus according to claim 7, wherein at least one of the first fixing apparatus and the second fixing apparatus includes a crack detection portion configured to issue an abnormality notification signal in accordance with cracking of a board on which a heating element is disposed, or a breakage detection portion configured to issue an abnormality notification signal in accordance with breakage of a heating element, wherein the signal line is configured to transmit an abnormality notification signal sent from the crack detection portion or the breakage detection portion, to the power shutoff portion, and wherein if the abnormality notification signal from the crack detection portion or the breakage detection portion is transmitted to the power shutoff portion, the power shutoff portion shuts off the electric power supplied to the first fixing apparatus or the second fixing apparatus attached to the attachment portion.

9. The image forming apparatus according to claim 1, wherein if a group of the plurality of groups that has a largest maximum current value is defined as a first group and a group of the plurality of groups that has a smallest maximum current value is defined as a second group, an allowable current value of the power line of a power supply path of the power supply circuit that corresponds to the first group is larger than an allowable current value of the power line of a power supply path of the plurality of power supply paths that corresponds to the second group.

10. An image forming apparatus comprising:

an attachment portion to which any one of a first fixing apparatus and a second fixing apparatus is selectively attached; and a power supply circuit including a plurality of power supply paths by which electric power is supplied to the first fixing apparatus or the second fixing apparatus attached to the attachment portion, the plurality of power supply paths being configured to control the electric power independently from each other, wherein each of the power supply paths includes a control element configured to control electric power, wherein the first fixing apparatus includes a plurality of first heating elements configured to generate heat when energized, the plurality of first heating elements is grouped into a plurality of groups configured to receive power supply independently from each other, and a number of the plurality of groups is equal to a number of the plurality of power supply paths, wherein the second fixing apparatus includes at least one second heating element configured to generate heat when energized, and the at least one second heating element is grouped into at least one group whose number is smaller than the number of the power supply paths, and wherein in a state where the second fixing apparatus is attached to the image forming apparatus, a power supply path of the plurality of power supply paths in which the control element has a largest allowable current value is electrically connected with the at least one second heating element.

11. The image forming apparatus according to claim 10, wherein each of the plurality of power supply paths includes a power line configured to transmit electric power, and wherein in a state where the second fixing apparatus is attached to the image forming apparatus, at least a power supply path of the plurality of power supply paths in which the power line has a largest allowable current value is electrically connected with the at least one second heating element.

12. The image forming apparatus according to claim 10, wherein in a power supply path of the plurality of power supply paths that is electrically connected with the at least one second heating element, an allowable current value of the control element is equal to or larger than three times a maximum current value of a group of the plurality of groups that corresponds to the power supply path, or is larger the maximum current value by 5 A or more.

13. The image forming apparatus according to claim 10, wherein in a state where the second fixing apparatus is attached to the image forming apparatus, one part of the plurality of power supply paths is electrically connected with the at least one second heating element, and another part of the plurality of power supply paths is not electrically connected with the at least one second heating element.

14. The image forming apparatus according to claim 10, wherein in a state where the second fixing apparatus is attached to the image forming apparatus, a power supply path of the plurality of power supply paths in which the control element has a smallest allowable current value is not electrically connected with the at least one second heating element.

15. The image forming apparatus according to claim 10, wherein a power supply path of the plurality of power supply paths that is electrically connected in a state where the first fixing apparatus is attached to the image forming apparatus, with a group of the plurality of groups that has a largest resistance value is not electrically connected with the at least one second heating element in a state where the second fixing apparatus is attached to the image forming apparatus.

16. The image forming apparatus according to claim 10, wherein the first fixing apparatus further includes a first temperature-detection portion configured to issue a detection signal in accordance with a temperature of the first heating elements, and a first abnormality-detection portion configured to issue an abnormality notification signal depending on the detection signal from the first temperature-detection portion, wherein the second fixing apparatus further includes a second temperature-detection portion configured to issue a detection signal in accordance with a temperature of the at least one second heating element, and a second abnormality-detection portion configured to issue an abnormality notification signal depending on the detection signal from the second temperature-detection portion, wherein the image forming apparatus further includes a signal line configured to transmit an abnormality notification signal sent from the first abnormality-detection portion in a state where the first fixing apparatus is attached to the image forming apparatus, and transmit an abnormality notification signal sent from the second abnormality-detection portion in a state where the second fixing apparatus is attached to the image forming apparatus, and a power shutoff portion configured to shut off the electric power supplied to the first fixing apparatus or the second fixing apparatus, the power shutoff portion being configured to shut off the electric power if an abnormality notification signal is transmitted to the power shutoff portion through the signal line.

17. The image forming apparatus according to claim 16, wherein at least one of the first fixing apparatus and the second fixing apparatus includes a crack detection portion configured to issue an abnormality notification signal in accordance with cracking of a board on which a heating element is disposed, or a breakage detection portion configured to issue an abnormality notification signal in accordance with breakage of a heating element, wherein the signal line is configured to transmit an abnormality notification signal sent from the crack detection portion or the breakage detection portion, to the power shutoff portion, and wherein if the abnormality notification signal from the crack detection portion or the breakage detection portion is transmitted to the power shutoff portion, the power shutoff portion shuts off the electric power supplied to the first fixing apparatus or the second fixing apparatus attached to the attachment portion.

18. The image forming apparatus according to claim 10, wherein if a group of the plurality of groups that has a largest maximum current value is defined as a first group and a group of the plurality of groups that has a smallest maximum current value is defined as a second group, an allowable current value of the control element of a power supply path of the plurality of power supply paths that corresponds to the first group is larger than an allowable current value of the control element of a power supply path of the plurality of power supply paths that corresponds to the second group.

19. An image forming apparatus comprising:

an attachment portion to which any one of a first fixing apparatus and a second fixing apparatus is selectively attached; and a power supply circuit including a plurality of power supply paths by which electric power is supplied to the first fixing apparatus or the second fixing apparatus attached to the attachment portion, the plurality of power supply paths being configured to control the electric power independently from each other, wherein the first fixing apparatus includes a plurality of first heating elements configured to generate heat when energized, the plurality of first heating elements is grouped into a plurality of groups configured to receive power supply independently from each other, and a number of the plurality of groups is equal to a number of the plurality of power supply paths, wherein the second fixing apparatus includes at least one second heating element configured to generate heat when energized, and the at least one second heating element is grouped into at least one group whose number is smaller than the number of the power supply paths, and wherein in a state where the second fixing apparatus is attached to the image forming apparatus, one part of the plurality of power supply paths is electrically connected with the at least one second heating element, and another part of the plurality of power supply paths is not electrically connected with the second heating element.

20. The image forming apparatus according to claim 19, wherein each of the plurality of power supply paths includes a power line configured to transmit electric power, and wherein in a state where the second fixing apparatus is attached to the image forming apparatus, a power supply path of the plurality of power supply paths in which the power line has a largest allowable current value is electrically connected with the at least one second heating element.

21. The image forming apparatus according to claim 19, wherein each of the power supply paths includes a control element configured to control the electric power supplied to the first fixing apparatus or the second fixing apparatus, and wherein in a state where the second fixing apparatus is attached to the image forming apparatus, a power supply path of the plurality of power supply paths in which the control element has a largest allowable current value is electrically connected with the at least one second heating element.

22. The image forming apparatus according to claim 19, wherein a power supply path of the plurality of power supply paths that is electrically connected in a state where the first fixing apparatus is attached to the image forming apparatus, with a group of the plurality of groups that has a largest resistance value is not electrically connected with the at least one second heating element in a state where the second fixing apparatus is attached to the image forming apparatus.

23. The image forming apparatus according to claim 19, wherein the first fixing apparatus further includes a first temperature-detection portion configured to issue a detection signal in accordance with a temperature of the first heating elements, and a first abnormality-detection portion configured to issue an abnormality notification signal depending on the detection signal from the first temperature-detection portion, wherein the second fixing apparatus further includes a second temperature-detection portion configured to issue a detection signal in accordance with a temperature of the second heating element, and a second abnormality-detection portion configured to issue an abnormality notification signal depending on the detection signal from the second temperature-detection portion, wherein the image forming apparatus further includes a signal line configured to transmit an abnormality notification signal sent from the first abnormality-detection portion in a state where the first fixing apparatus is attached to the image forming apparatus, and transmit an abnormality notification signal sent from the second abnormality-detection portion in a state where the second fixing apparatus is attached to the image forming apparatus, and a power shutoff portion configured to shut off the electric power supplied to the first fixing apparatus or the second fixing apparatus, the power shutoff portion being configured to shut off the electric power if an abnormality notification signal is transmitted to the power shutoff portion through the signal line.

24. The image forming apparatus according to claim 23, wherein at least one of the first fixing apparatus and the second fixing apparatus includes a crack detection portion configured to issue an abnormality notification signal in accordance with cracking of a board on which a heating element is disposed, or a breakage detection portion configured to issue an abnormality notification signal in accordance with breakage of a heating element, wherein the signal line is configured to transmit an abnormality notification signal sent from the crack detection portion or the breakage detection portion, to the power shutoff portion, and wherein if the abnormality notification signal from the crack detection portion or the breakage detection portion is transmitted to the power shutoff portion, the power shutoff portion shuts off the electric power supplied to the first fixing apparatus or the second fixing apparatus attached to the attachment portion.

25. An image forming apparatus comprising:

an attachment portion to which any one of a first fixing apparatus and a second fixing apparatus is selectively attached, wherein the first fixing apparatus includes (a) a plurality of first heating elements configured to generate heat when energized, and grouped into a plurality of groups configured to receive power supply independently from each other, (b) a first temperature-detection portion configured to issue a detection signal in accordance with a temperature of the first heating elements, and (c) a first abnormality-detection portion configured to issue an abnormality notification signal depending on the detection signal from the first temperature-detection portion, and wherein the second fixing apparatus includes (a) at least one second heating element configured to generate heat when energized, and grouped into at least one group whose number is smaller than a number of the plurality of groups, (b) a second temperature-detection portion configured to issue a detection signal in accordance with a temperature of the at least one second heating element, and (c) a second abnormality-detection portion configured to issue an abnormality notification signal depending on the detection signal from the second temperature-detection portion;

a signal line configured to transmit an abnormality notification signal sent from the first abnormality-detection portion in a state where the first fixing apparatus is attached to the image forming apparatus, and transmit an abnormality notification signal sent from the second abnormality-detection portion in a state where the second fixing apparatus is attached to the image forming apparatus; and a power shutoff portion configured to shut off electric power supplied to the first fixing apparatus or the second fixing apparatus, the power shutoff portion being configured to shut off the electric power if an abnormality notification signal is transmitted to the power shutoff portion through the signal line.

* * * * *